(12) United States Patent
Song et al.

(10) Patent No.: US 8,547,977 B2
(45) Date of Patent: Oct. 1, 2013

(54) METHOD AND APPARATUS FOR PROVIDING NOTIFICATION MESSAGE IN A BROADCASTING SYSTEM

(75) Inventors: Jae-Yeon Song, Seoul (KR); Kook-Heui Lee, Yongin-si (KR); Sung-Oh Hwang, Yongin-si (KR); Bo-Sun Jung, Seongnam-si (KR); Jong-Hyo Lee, Pyeongtaek-si (KR); Jai-Yong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1442 days.

(21) Appl. No.: 11/505,495

(22) Filed: Aug. 17, 2006

(65) Prior Publication Data
US 2007/0041377 A1 Feb. 22, 2007

(30) Foreign Application Priority Data

Aug. 17, 2005 (KR) .................. 10-2005-0075460
Oct. 7, 2005 (KR) .................. 10-2005-0094613
Jun. 28, 2006 (KR) .................. 10-2006-0058941

(51) Int. Cl.
*H04L 12/56* (2006.01)
(52) U.S. Cl.
USPC .............................. 370/390; 370/392; 725/51
(58) Field of Classification Search
None
See application file for complete search history.

(56) References Cited

U.S. PATENT DOCUMENTS

| | | | |
|---|---|---|---|
| 7,330,693 B1* | 2/2008 | Goss | 455/3.01 |
| 7,664,063 B2* | 2/2010 | Paila et al. | 370/312 |
| 2005/0043020 A1 | 2/2005 | Lipsann | |
| 2005/0204387 A1* | 9/2005 | Knudson et al. | 725/52 |
| 2006/0123099 A1* | 6/2006 | Paila et al. | 709/219 |
| 2006/0159117 A1* | 7/2006 | Furlong et al. | 370/432 |
| 2006/0189300 A1 | 8/2006 | Hwang et al. | |
| 2006/0294205 A1* | 12/2006 | Aaltonen et al. | 709/219 |
| 2007/0086465 A1* | 4/2007 | Paila et al. | 370/394 |
| 2007/0240188 A1* | 10/2007 | Vermola et al. | 725/62 |

FOREIGN PATENT DOCUMENTS

| | | |
|---|---|---|
| EP | 1 202 520 | 5/2002 |
| EP | 1 816 766 | 8/2007 |
| GB | 2 396 228 | 6/2004 |
| KR | 10200030008681 | 1/2003 |
| KR | 1020050015544 | 2/2005 |

(Continued)

OTHER PUBLICATIONS

Open Mobile Alliance, Mobile Broadcast Service Architecture Draft v1.0, Apr. 20, 2005 p. 33-36.*
Oma Open Mobile Alliance, "Mobile Broadcast Services Architecture, Draft Version 1.0-20 04 2005", Apr. 20 2005, http://member.openmobilealliance.org/ftp/Public_documents/BCAST/Permanent_documents/.

*Primary Examiner* — Faruk Hamza
*Assistant Examiner* — Tito Pham
(74) *Attorney, Agent, or Firm* — Roylance, Abrams, Berdo and Goodman, LLP

(57) ABSTRACT

Provided is a broadcasting system based on a network using an Internet protocol (IP). In the broadcasting system, a broadcast transmitter previously transmits first access information including a first network address for transmitting a general notification message and second access information associated with management of the broadcasting system, to a broadcast receiver. If a general notification event occurs, the general notification message is generated and the generated general notification message is transmitted to the broadcast receiver via one of a broadcast network and an interaction network using the first network address. The broadcast receiver receives a general notification message based on the first network address in data received from the broadcast transmitter.

19 Claims, 20 Drawing Sheets

(56) References Cited

FOREIGN PATENT DOCUMENTS

| KR | 10-2006-0085893 A | 7/2006 |
| RU | 2 073 913 C1 | 2/1997 |
| WO | WO 01/17288 | 3/2001 |
| WO | WO 03/045064 | 5/2003 |
| WO | WO 2004/056096 | 7/2004 |
| WO | WO 2004056096 A1 * | 7/2004 |
| WO | WO 2005/041567 | 5/2005 |
| WO | WO 2005/041594 | 5/2005 |

* cited by examiner

METHOD AND APPARATUS FOR PROVIDING NOTIFICATION MESSAGE IN A BROADCASTING SYSTEM

CROSS-REFERENCE TO RELATED APPLICATIONS

This application claims the benefit under 35 U.S.C. §119(a) of an application entitled "Method and Apparatus for Providing Notification Message in a Broadcasting System" filed in the Korean Intellectual Property Office on Aug. 17, 2005 and assigned Serial No. 2005-75460, an application entitled "Method and Apparatus for Providing Notification Message in a Broadcasting System" filed in the Korean Intellectual Property Office on Oct. 7, 2005 and assigned Serial No. 2005-94613, and an application entitled "Method and Apparatus for Providing Notification Message in a Broadcasting System" filed in the Korean Intellectual Property Office on Jun. 28, 2006 and assigned Serial No. 2006-58941, the entire disclosures of each of which are hereby incorporated by reference.

BACKGROUND OF THE INVENTION

1. Field of the Invention

The present invention relates generally to a broadcasting system supporting broadcast service. More particularly, the present invention relates to a method and apparatus for providing a notification message in a broadcasting system supporting mobile broadcast service.

2. Description of the Related Art

A mobile broadcast system includes several processes, including: service discovery by a terminal capable of receiving a mobile broadcast service; service subscription by the terminal; provisioning of various control information for reception of the service; transmission of the service; and reception of the service by the terminal. In the process of receiving the mobile broadcast service from the mobile broadcast system, the terminal receives a notification message containing various control information for the broadcast service.

An example of such a mobile broadcast system is disclosed in detail in Korean Patent Application No. 2005-16650 filed by the applicant, the entire disclosure of which is hereby incorporated by reference. In this broadcast system, changes may occur due to various causes while the terminal is receiving the broadcast. Some of the changes can be the information that should be notified to the terminal. For example, the change information can include a change in the mobile broadcast service time, and a change in the information for reception of the mobile broadcast service.

The disclosed broadcast system presents a mobile broadcast notification architecture. However, the terminal capable of receiving the mobile broadcast service cannot receive the notification message because there is no definition of the basic information for reception of the notification message, and of the actual transmission/reception of the notification message. Accordingly, there is a need for a definition of these particular items of information.

SUMMARY OF THE INVENTION

Exemplary embodiments of the present invention address at least the above problems and/or disadvantages and provide at least the advantages described below. Accordingly, an aspect of the present invention is to provide a system and method for transmitting a control message in a broadcasting system supporting mobile broadcast service.

It is another aspect of an exemplary embodiment of the present invention to provide a system and method for generating and transmitting a notification message to the terminal in service in a broadcasting system supporting mobile broadcast service.

It is further another aspect of an exemplary embodiment of the present invention to provide an apparatus and method for transmitting a notification message to a terminal that is sleeping or accessing another interaction system in a broadcasting system supporting a mobile broadcast service.

According to one aspect of an exemplary embodiment of the present invention, there is provided a method for providing a broadcast service in a transmitter of an Internet protocol (IP)-based broadcasting system. The method comprises the steps of (a) transmitting first access information including a first network address for transmitting a general notification message to a broadcast receiver that receives the broadcast service, and second access information associated with management of the broadcasting system, to the broadcast receiver via one of a broadcast network and an interaction network; and (b) generating the general notification message and transmitting the generated general notification message to the broadcast receiver via one of the broadcast network and the interaction network using the first network address, if a general notification event occurs.

According to another aspect of an exemplary embodiment of the present invention, there is provided a transmitter of an Internet protocol (IP)-based broadcasting system. The transmitter comprises first means for transmitting first access information including a first network address for transmitting a general notification message, and second access information associated with management of the broadcasting system via one of a broadcast network and an interaction network; and second means for generating, if a general notification event occurs, the general notification message and transmitting the generated general notification message via one of the broadcast network and the interaction network using the first network address.

According to further another aspect of an exemplary embodiment of the present invention, there is provided a method for receiving a broadcast service in a broadcast receiver of an Internet protocol (IP)-based broadcasting system. The method comprises the steps of: (a) receiving first access information including a first network address for receiving a general notification message and second access information associated with management of the broadcasting system, from a broadcast transmitter via one of a broadcast network and an interaction network; and (b) receiving a general notification message based on the first network address in data received from the broadcast transmitter.

According to yet another aspect of an exemplary embodiment of the present invention, there is provided a broadcast receiver of an Internet protocol (IP)-based broadcasting system. The broadcast receiver comprises first means for receiving first access information including a first network address for receiving a general notification message and second access information associated with management of the broadcasting system, from a broadcast transmitter via one of a broadcast network and an interaction network; and second means for receiving a general notification message based on the first network address in the received from the broadcast transmitter.

According to still another aspect of an exemplary embodiment of the present invention, there is provided a method for providing a broadcast service in a broadcasting system based on a network using an Internet protocol (IP). The method comprises the steps of: (a) transmitting, by a broadcast transmitter, first access information including a first network address for transmitting a general notification message to a broadcast receiver, and second access information associated with management of the broadcasting system, to the broadcast receiver via one of a broadcast network and an interaction network; (b) if a general notification event occurs, generating the general notification message and transmitting the generated general notification message to the broadcast receiver via one of the broadcast network and the interaction network using the first network address; and (c) receiving a general notification message based on the first network address in data received from the broadcast transmitter.

According to still another aspect of an exemplary embodiment of the present invention, there is provided a broadcasting system based on a network using an Internet protocol (IP). The broadcasting system comprises a broadcast transmitter for previously transmitting first access information including a first network address for transmitting a general notification message and second access information associated with management of the broadcasting system, to a broadcast receiver, and if a general notification event occurs, generating the general notification message and transmitting the generated general notification message to the broadcast receiver via one of a broadcast network and an interaction network using the first network address; and the broadcast receiver for receiving a general notification message based on the first network address in data received from the broadcast transmitter.

According to yet another aspect of an exemplary embodiment of the present invention, there is provided a computer-readable recording medium storing a program for implementing a method for providing a broadcast service in a transmitter of an Internet protocol (IP)-based broadcasting system. The method includes the step of (a) transmitting first access information including a first network address for transmitting a general notification message to a broadcast receiver that receives the broadcast service, and second access information associated with management of the broadcasting system, to the broadcast receiver via one of a broadcast network and an interaction network. Additionally, the method includes the step of (b) generating the general notification message and transmitting the generated general notification message to the broadcast receiver via one of the broadcast network and the interaction network using the first network address, if a general notification event occurs.

According to still another aspect of an exemplary embodiment of the present invention, there is provided a computer-readable recording medium storing a program for implementing a method for receiving a broadcast service in a broadcast receiver of an Internet protocol (IP)-based broadcasting system. The method comprises the step of (a) receiving first access information including a first network address for receiving a general notification message and second access information associated with management of the broadcasting system, from a broadcast transmitter via one of a broadcast network and an interaction network. Additionally, the method includes the step of (b) receiving a general notification message based on the first network address in data received from the broadcast transmitter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of certain embodiments of the present invention will become more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

An exemplary embodiment of the present invention includes an apparatus and method for generating and transmitting a notification message to the terminal receiving a mobile broadcast service, when service/system-related changes occur in the broadcasting system supporting the mobile broadcast service or there is a need to notify of an emergency situation. In addition, an exemplary embodiment of the present invention provides a method capable of delivering a notification message, regardless of whether the terminal is receiving the service or not. In the following description, a mobile communication system supporting the mobile broadcast service will be referred to as a "mobile broadcast system."

For clarity and conciseness, after an exemplary embodiment of the mobile broadcast system is presented, a format of a notification message according to an exemplary embodiments of the present invention and the mobile broadcast system to which the message format is applied will be described. Thereafter, a description will be made of an apparatus and method for generating and transmitting the notification message in the mobile broadcast system according to an exemplary embodiment of the present invention. A first exemplary embodiment will be described with reference to the broadcasting system defined in the $3^{rd}$ Generation Partnership Project (3GPP), which is a standard group for asynchronous mobile communication, or Open Mobile Alliance (OMA), which is a standard group for terminal applications. A second exemplary embodiment will be described with reference to a Digital Video Broadcasting-Convergence of Broadcasting and Mobile Service (DVB-CBMS) system defined by another standard group for mobile broadcasting.

A description will now be made of a mobile broadcast system according to the first exemplary embodiment to accommodate the understanding of the notification message. Although names of the entities used in the OMA mobile broadcast system will be used in the first exemplary embodiment, the use of the names and the OMA standard should not limit the scope of the exemplary embodiments of the present invention, and the first exemplary embodiment can be applied to any system having a similar technical background.

Figure 1:
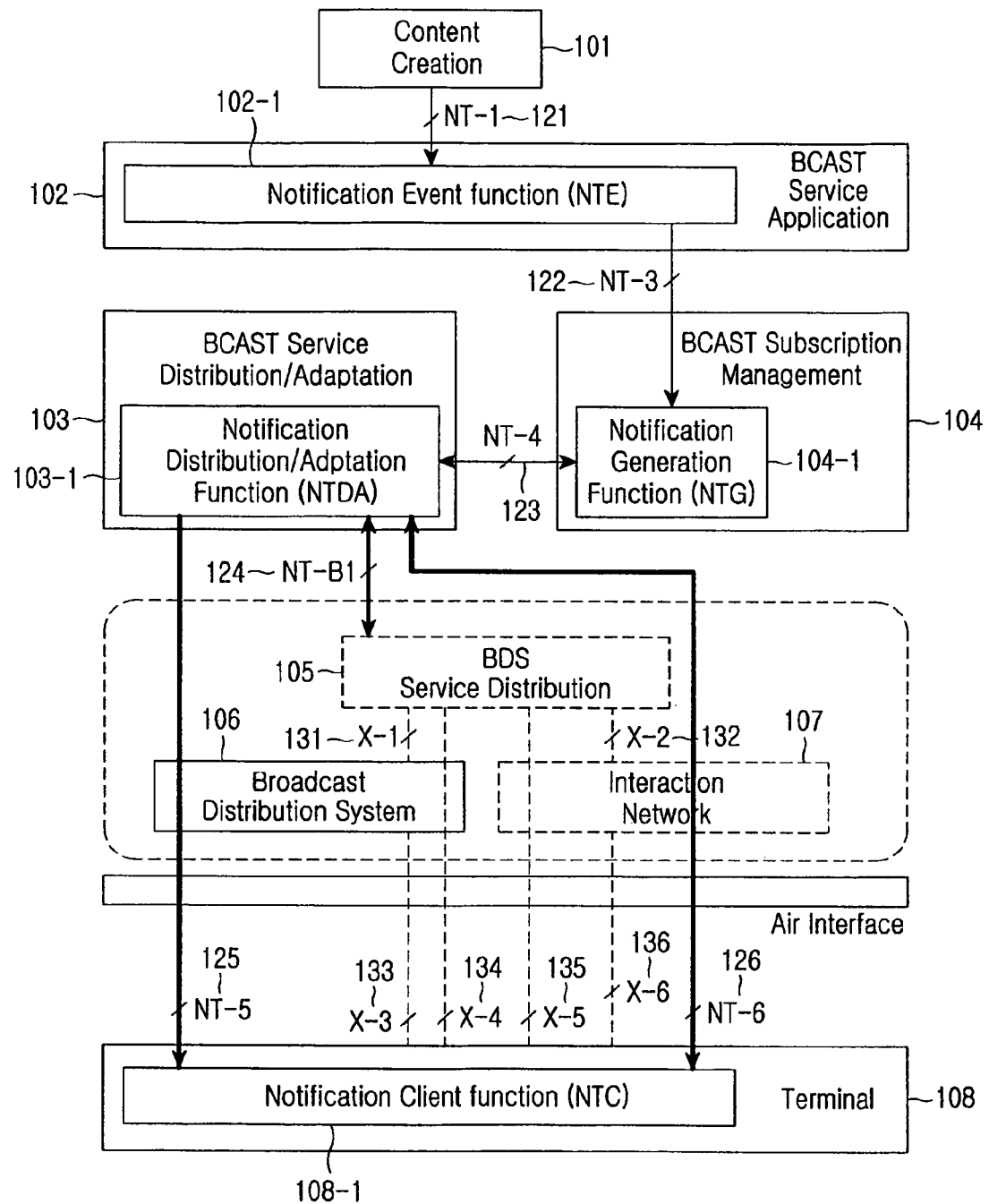
FIG. 1 is a diagram illustrating functional architecture for transmitting a notification message in a mobile broadcast system according to the first an exemplary embodiment of the present invention.

FIG. 1 is a diagram illustrating functional architecture for transmitting a notification message in a mobile broadcast system according to the first exemplary embodiment of the present invention. The system shown in FIG. 1 is defined by the Open Mobile Alliance Browser and Content Mobile Broadcast (OMA BAC BCAST) Working group, one of the standard groups for mobile broadcast terminals. Although an exemplary embodiment of the present invention will be described with reference to the OMA BCAST notification broadcast architecture, it can also be applied to the other mobile broadcast systems having a notification messaging function among the broadcasting systems based on Internet Protocol (IP), and this exemplary embodiment will not limit the scope of the exemplary embodiment of present invention. In addition, although an exemplary embodiment of the present invention uses a "service guide" as the information including, for example, a broadcast service-related description and reception method of the BCAST system. Also used is an "access fragment" as the information including a broadcast service access method. The terms "service guide" and "access fragment" can be defined as different terms according to a type of the broadcasting system.

Referring to FIG. 1, a Content Creation 101 is a provider of a broadcast service (hereinafter referred to as a BCAST service). The BCAST service can include the conventional audio/video broadcast service, file (music file or data file) download service, or the like. If there is any problem in providing the BCAST service or any change in the content of the service, the Content Creation 101 notifies the change to a Notification Event Function (NTE) 102-1 in a BCAST Service Application 102.

The BCAST Service Application 102 has a function of receiving data for the BCAST service provided from the Content Creation 101, handling the received data in the form appropriate for the broadcast network, and generating BCAST service data. The BCAST Service Application 102 also has a function of generating standardized metadata necessary for a mobile broadcast guide. In addition, the BCAST Service Application 102 receives a change in the BCAST service, notified by the Content Creation 101, and notifies the change to a Notification Generation Function 104-1 located in a BCAST Subscription Management 104.

A BCAST Service Distribution/Adaptation 103 has a function of setting up a bearer for transmitting the BCAST service data provided from the BCAST Service Application 102, a function of determining a transmission schedule for the BCAST service, and a function of generating a mobile broadcast guide. The BCAST Service Distribution/Adaptation 103 is connected to a Broadcast Distribution System (BDS) 106 capable of providing the BCAST service, or an Interaction Network 107 supporting interaction communication. In addition, the BCAST Service Distribution/Adaptation 103, including therein a Notification Distribution/Adaptation Function (NTDA) 103-1, receives a notification message from the BCAST Subscription Management 104 and transmits the notification message to one or a plurality of users via the BDS 106 or the Interaction Network 107.

The BCAST Subscription Management 104 manages subscription information for reception of the BCAST service, service provisioning information, and device information for a device receiving the BCAST service. In particular, the BCAST Subscription Management 104, as it includes the Notification Generation Function 104-1, generates a notification message using notification event information received from the Content Creation 101 or the BDS 106, or generates a notification message for the BCAST service event.

A BDS Service Distribution 105 has a function of distributing all received BCAST services through a broadcast channel or an interaction channel. The BDS Service Distribution 105 is an entity that can either exist or not exist according to the type of the BDS 106 implemented.

The BDS 106 is a network for transmitting BCAST services, and can be, for example, DVB-H, 3GPP Multimedia Broadcast Multicast Service (MBMS), 3GPP2 BroadCast/ MultiCast Service (BCMCS), or the like. In addition, in the case where there is a change in transmitting a particular BCAST service, if an X-1 interface 131 or the BDS Service Distribution 105 exists, the BDS 106 notifies the change to the BCAST Service Distribution/Adaptation 103 via an NT-B1 interface 124.

The Interaction Network 107 transmits BCAST services on a point-to-point basis, or interactively exchanges control information and additional information related to reception of the BCAST services, and can be, for example, an existing cellular network.

The Terminal 108 is capable of receiving the BCAST service and may have a function of accessing the cellular network according to its capability. It is assumed herein that the Terminal 108 is a terminal capable of accessing the cellular network. The Terminal 108 receives a notification message transmitted via an NT-5 interface 125 using a Notification Client Function (NTC) 108-1, and performs an appropriate operation according to the received notification message. Alternatively, the Terminal 108 receives a notification message transmitted via an NT-6 interface 126, and performs an appropriate operation according to the received notification message.

Next, a description will be made of interfaces between the above entities.

An NT-1 interface 121 is an interface between the Notification Event Function 102-1 located in the BCAST Service Application 102 and the Content Creation 101. The NT-1 interface 121 is used to deliver a corresponding notification event to the Notification Event Function 102-1 when a notification-requiring event occurs in the Content Creation 101.

An NT-3 interface 122 is an interface from the Notification Event Function 102-1 located in the BCAST Service Application 102 to the Notification Generation Function 104-1 of the BCAST Subscription Management 104. The NT-3 interface 122 delivers the information necessary for notification of an event or for generation of a notification message so that the Notification Generation Function 104-1 can generate the notification message.

An NT-4 interface 123 is an interface between the Notification Generation Function 104-1 located in the BCAST Subscription Management 104 and the Notification Distribution/Adaptation Function 103-1 of the BCAST Service Distribution/Adaptation 103. The NT-4 interface 123 is used for transmitting a notification message to the Notification Distribution/Adaptation Function 103-1 in order to transmit the notification message generated in the Notification Generation Function 104-1 to the BDS 106 or the Interaction Network 107. Instead, the NT-4 interface 123 may be used by the Notification Distribution/Adaptation Function 103-1 to transmit a notification message for an event occurred in the BDS 106.

The NT-5 interface 125 is an interface used when the notification message provided from the Notification Distribution/ Adaptation Function 103-1 of the BCAST Service Distribution/Adaptation 103 is directly transmitted to the Terminal 108 through a broadcast channel via the BDS 106. The NT-5 interface 125 is used for transmitting a notification message to one or a plurality of terminals.

The NT-6 interface 126 is an interface used when the notification message provided from the Notification Distribution/ Adaptation Function 103-1 of the BCAST Service Distribution/Adaptation 103 is directly transmitted to the Terminal 108 through a dedicated channel to the Terminal 108 via the Interaction Network 107, or through a broadcast channel provided by the Interaction Network 107. The NT-6 interface 126 is used for transmitting a notification message to one or a plurality of terminals 108.

The NT-B1 interface 124 is an interface between the BCAST Service Distribution/Adaptation 103 and the BDS Service Distribution 105, and is used as a transmission path by the BCAST Service Distribution/Adaptation 103 at the BDS 106, or as a reception path for the event information generated in the BDS 106.

The X-1 interface 131 is an interface used as a transmission path that the BCAST Service Distribution/Adaptation 103 will use in the BDS, or is used as a reception path of the event information generated in the BDS 106, when the BDS Service Distribution 105 does not exist. However, when the BDS Service Distribution 105 exists, the X-1 interface 131 is used as an interface between the BDS 106 and the BDS Service Distribution 105, for notifying that the event occurred in the BDS 106.

An X-2 interface 132 is an interface used for setting up a transmission path that the BCAST Service Distribution/Adaptation 103 will use in the Interaction Network 107 when the BDS Service Distribution 105 does not exist. However, when the BDS Service Distribution 105 does exists, the X-2 interface 132 is used as an interface between the BDS 106 and the Interaction Network 107, for setting up a bearer where a notification message is to be used in the Interaction Network 107 and for transmitting a notification message.

An X-3 interface 133, an interface between the BDS 106 and the Terminal 108, is used for the BCAST service or all messages transmitted through the broadcast channel.

An X-4 interface 134 is a broadcast channel interface between the BDS Service Distribution 105 and the Terminal 108.

An X-5 interface 135 is an interaction channel interface between the BDS Service Distribution 105 and the Terminal 108.

An X-6 interface 136 is an interaction interface via which the Interaction Network 107 can transmit control information related to the BCAST service.

The Notification Event Function 102-1 has a function of delivering the information necessary for generating a notification message to the Notification Generation Function 104-1, and upon detecting an occurrence of a notification-requiring event, delivers information on the event to the Notification Generation Function 104-1. The Notification Generation Function 104-1 generates a notification message using the information and event necessary for generating a notification message, received from the Notification Event Function 102-1. When the Notification Generation Function 104-1 receives a notification event from the BDS 106 via the Notification Distribution/Adaptation Function 103-1, it generates a notification message and transmits the notification message to the Notification Distribution/Adaptation Function 103-1. In the process of generating the notification message, if there is a need to re-indicate a start of the service, the Notification Generation Function 104-1 receives a notification indicating a change in the service information from the Content Creation 101. Accordingly, defined is one case where there is a need for transmitting a new mobile broadcast guide and another case where a particular event occurs in the BDS 106.

The Notification Distribution/Adaptation Function 103-1 serves to transmit a notification message via the NT-5 interface 125 or the NT-6 interface 126, and to deliver a notification event indicating a change in the information on a particular mobile broadcast service from the BDS 106 to the Notification Generation Function 104-1 via the NT-4 interface 123. Herein, the change in the information on the broadcast service can include, for example, adjustment of a data rate or impossibility of the service due to wireless network environment.

Before a detailed description of a method capable of receiving the notification message is given, types of the notification messages will first be described.

The notification message can be roughly divided into two types.

A first notification message is a general notification message that is delivered to every user for general purpose. This notification message is used by the service provider to provide disaster broadcast or system change information to the users.

A second notification message is a specific notification message that is limited to a specific service. This notification message is transmitted only to the users receiving the corresponding service, and is used to indicate a change and start of the service.

A description will now be made of transmission of the general notification message, or the first notification message.

ServiceGuideDeliveryDescriptor (SGDD), or a service guide delivery message, according to an exemplary embodiment of the present invention will now be described. The general notification message according to an exemplary embodiment of the present invention is shown in Table 1 and Table 2 below. Table 1 and Table 2 show elements and attributes of the ServiceGuideDeliveryDescriptor (SGDD) used for OMA broadcast. For convenience, Table 1 and Table 2 are divided from a single table.

TABLE 1

| Name | Type | Category | Cardinality | Description |
|---|---|---|---|---|
| ServiceGuideDeliveryDescriptor | E | M | 1 ... N | The Service Guide Delivery Descriptor |
| DescriptorEntry | E1 | M | 1 ... N | An entry in the Service Guide Delivery Descriptor. |
| Transport | E2 | M | 1 | The pointer to the transport session delivering the Service Guide fragments within Service Guide Delivery Units announced in this DescriptorEntry. |
| IpAddress | A | M | 1 | IP address of the target delivery session |
| Port | A | M | 1 | Port of target delivery session |
| SessionID | A | M | 1 | Identifier of target delivery session |
| AlternativeAccessURL | E2 | O | 0 ... N | Alternative URL for retrieving the Service Guide delivery units via the interaction channel |
| ServiceGuideDeliveryUnit | E2 | M | 1 ... N | A group of fragments. |
| transportObjectID | A | O | 0 ... 1 | The transport object ID of the Service Guide Delivery Unit carrying the declared fragments within this FragmentGroup. |
| validFrom | A | M | 1 | The first moment of time this group of Service Guide fragments is valid. The format is NTP. |
| validTo | A | M | 1 | The last moment of time this group of Service Guide fragments is valid. The format is NTP. |

TABLE 2

| Name | Type | Category | Cardinality | Description |
|---|---|---|---|---|
| Fragment | E3 | M | 1 ... N | Declaration of Service Guide fragment that is available over broadcast channel. |
| FragmentID | A | M | 1 | The identifier of the announced Service Guide fragment. |
| FragmentVersion | A | M | 1 | The version of the announced Service Guide fragment. Note: The scope of the FragmentVersion is limited to the given transport session. The value of FragmentVersion turn over from $2^{32} - 1$ to 0. |
| Type | A | M | 1 | Enumeration value designating the schema or MIME type for fragment. When most significant bit==1: user defined type is allowed. |
| Notification Entry | E1 | M | 1 | An entry for Notification Message in the Service Guide Delivery Descriptor. |
| Notification Port | A | M | 1 | Port of Notification Message delivery |

TABLE 2-continued

| Name | Type | Category | Cardinality | Description |
| --- | --- | --- | --- | --- |
| Notification Address | A | O | 1 | IP address of Notification Message delivery |

The terms used in Table 1 and Table 2 will now be described. 'Name' indicates names of element values and attribute values constituting the corresponding message. 'Type' indicates whether the corresponding name corresponds to an element value or an attribute value. The element value has values of E1, E2, E3 and E4. E1 means an upper element value for the whole message, E2 indicates a sub-element value of E1, E3 indicates a sub-element value of E2, and E4 indicates a sub-element value of E3. The attribute value is indicated by A, and A indicates an attribute value of the corresponding element. For example, A under E1 indicates an attribute value of E1.

'Category' is used for indicating whether a corresponding element value or attribute value is mandatory, and has a value M if the value is mandatory, and a value O if the value is optional. 'Cardinality' indicates relations between the elements, and has values of '0', '0 . . . 1', '1', '0 . . . n', '1 . . . n', where "0" means an optional relation, "1" means a mandatory relation, and 'n' means the possibility of having a plurality of values. For example, '0 . . . n' means the possibility that there is no corresponding element value or there are n corresponding element values. 'Description' defines the meaning of the corresponding element or attribute value.

Referring to Table 1, there is shown elements and attributes of the ServiceGuideDeliveryDescriptor (SGDD) used for OMA broadcast. Prior to a description of the SGDD, a Service Guide (SG) will be described. The service guide is used to indicate which service is currently provided to the user in the mobile broadcast system. The information provided through the service guide can include information on the service itself, information on service purchase, information on service reception, and information on the service provider and the communication system.

The service guide is composed of several fragments according to characteristic of the information provided thereon. Therefore, in order to configure one complete service guide, it is necessary to receive a plurality of fragments. An object of the SGDD is to provide information on transmission schedule and transmission channels of the plurality of fragments, thereby allowing the terminal scheduled to receive the service guide fragments to efficiently receive the service guide fragments.

Referring to Table 1 and Table 2, DescriptorEntry provides information available for receiving random service guide fragments in the SGDD, and a plurality of 'DescriptorEntry's can exist.

Transport has position information for a transport session for delivering the service guide, and is defined by the following 3 attributes. An attribute IPAddress, one of the attributes of the element Transport, indicates an Internet Protocol (IP) address of the transport session. An attribute Port, one of the attributes of the element Transport, indicates a port number of the transport session. An attribute SessionID, one of the attributes of the element Transport, indicates an identifier (ID) of the transport session.

AlternativeAccessURL, when it is not possible to receive service guide fragments through a broadcast channel in the channel indicated by the DescriptorEntry, indicates a position where it is possible to receive the service guide fragments so that the mobile broadcast terminal can receive the service guide fragments through the Interaction Network 107, and AlternativeAccessURL is denoted by Universal Resource Locator (URL).

ServiceGuideDeliveryUnit indicates a bundle of several data fragments constituting the service guide, and is composed of the existing 3 attributes and a plurality of elements. The number of elements in ServiceGuideDeliveryUnit is in proportion to the number of data fragments. transportObjectID, one of attributes of the element ServiceGuideDeliveryUnit, indicates an ID of an object for delivering the service guide. validFrom, one of attributes of the element ServiceGuideDeliveryUnit, indicates a valid start time of the corresponding service guide data fragment. validTo, one of attributes of the element ServiceGuideDeliveryUnit, indicates a valid last time of the corresponding service guide data fragment.

Fragment is an element belonging to the ServiceGuideDeliveryUnit, and a plurality of Fragments can exist. Fragment, which is an information fragment for the currently available service guide, has 3 attributes. FragmentID, one of attributes of the element Fragment, indicates an ID of the information fragment. FragmentVersion, one of attributes of the element Fragment, indicates version information of the information fragment. Type, one of attributes of the element Fragment, indicates a schema or Multipurpose Internet Mail Extension (MIME) type of the information fragment.

An element NotificationEntry has two attributes of NotificationPort and NotificationAddress. The NotificationPort and NotificationAddress indicate information on the channel through which the terminal can receive the general notification message. In most mobile broadcast, use of IP as a data transmission technology is discussed. If a method, in which the terminal can receive the general notification message on the assumption that the IP is used, provides information on the IP address to which the general notification message is to be delivered, and provides information on a User Datagram Protocol (UDP) port number on the assumption that UDP is used over the IP, then the terminal can receive the general notification message. The reason for using the UDP is as follows. Although other transport protocols such as TCP can also be used, a header of the UDP transport protocol has less overhead and does not support reception acknowledgement, so the UDP transport protocol is appropriate for the characteristics of the unidirectionally transmitted broadcast service. NotificationPort has a UDP port number previously allocated such that the network provider or service provider uses the UDP port number when it sends the general notification message. The terminal, receiving a message transmitted via a UDP port designated for use of the general notification message, can immediately recognize the corresponding packet as a general notification message and process the packet, because it is aware of the UDP port for the general notification message through the SGDD.

The Notification Event Function 102-1 or the Notification Distribution/Adaptation Function 103-1 of FIG. 1 is available as an entity for generating a delivery message in order to deliver the general notification message. An apparatus for generating the delivery message has information on all sessions where the service is currently transmitted. That is, it is possible to attach the general notification message to the existing transport session, without generating a separate new session.

A basic identification unit of the session is composed of an IP address, and the general notification message uses an IP address of the ongoing session. If the mobile broadcast system delivers the general notification message through the ongoing IP session by simply differentiating the UDP port, the terminal can immediately receive the general notification message without the need to separately monitor the session. The NotificationPort can be used when the terminal is receiving the mobile broadcast service and desires to deliver the general notification message through an IP flow (or IP transport path) where the mobile broadcast service is being transmitted.

The NotificationAddress is used when there is an intention to allocate a dedicated IP address during delivery of the general notification message and to deliver the general notification message through a flow (or transport path) having the IP address. The NotificationAddress provides an IP address in order to deliver the general notification message to the terminal receiving the mobile broadcast service or the terminals in the idle mode, not receiving the mobile broadcast service to save power. The terminal scheduled to receive the general notification message has information of the NotificationPort and the NotificationAddress, and receives the general notification message as the entity desiring to deliver the terminal's situation or the general notification message sets a reception address of the general notification message.

Next, a description will be made of a method for delivering an SGDD message using the system of FIG. 1 as a mobile broadcast system according to an exemplary embodiment of the present invention.

Figure 2:
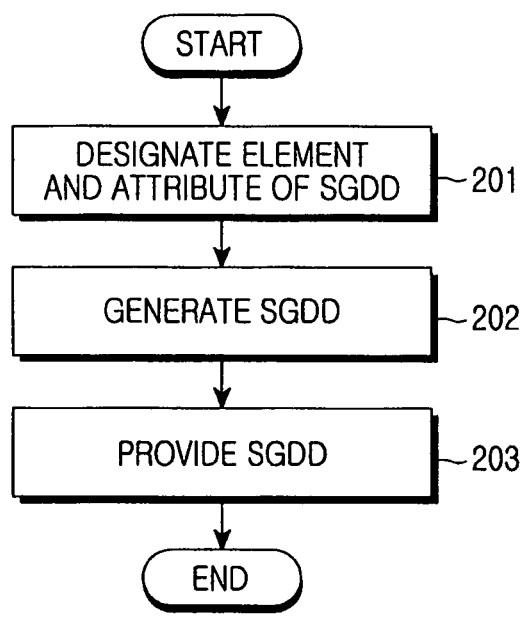
FIG. 2 is a flowchart illustrating a method for generating and transmitting an SGDD according to an exemplary embodiment of the present invention.

FIG. 2 is a flowchart illustrating a method for generating and transmitting an SGDD according to an exemplary embodiment of the present invention.

Referring to FIG. 2, a BCAST Service Distribution/Adaptation 103 designates elements and attributes of an SGDD to be delivered to a Terminal 108 in step 201. In step 201, the NotificationEntry, NotificationPort, and NotificationAddress values according to an exemplary embodiment of the present invention are designated. Herein, the elements and attributes of the SGDD have been previously determined according to the broadcast provider or system environment. After step 201, the BCAST Service Distribution/Adaptation 103 generates the SGDD in step 202. Thereafter, the BCAST Service Distribution/Adaptation 103 transmits the generated SGDD to the Terminal 108 in step 203. Although the designation and generation of the SGDD is achieved herein by the BCAST Service Distribution/Adaptation 103, it can also be accomplished by a Notification Event Function 102-1.

Figure 3:
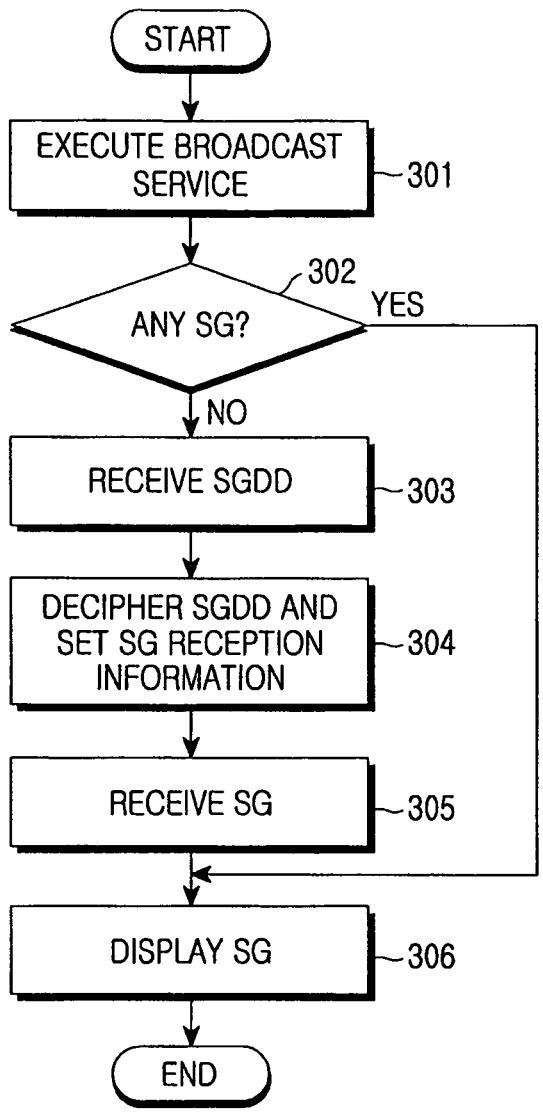
FIG. 3 is a flowchart illustrating a method for receiving an SGDD by a Terminal in a mobile broadcast system according to an exemplary embodiment of the present invention.

FIG. 3 is a flowchart illustrating a method for receiving an SGDD by a Terminal 108 in a mobile broadcast system according to an exemplary embodiment of the present invention.

Referring to FIG. 3, a Terminal 108 executes a broadcast service at the request of a user in step 301, and determines in step 302 whether there is a service guide (SG) in the Terminal 108, in order to display the service guide for the user. If there is a previously received service guide in step 302, the Terminal 108 displays the service guide on a display in step 306. However, if there is no service guide, the Terminal 108 receives an SGDD transmitted from a BCAST Service Distribution/Adaptation 103 in step 303.

In step 304, the Terminal 108 receiving the SGDD deciphers the SGDD to acquire information for reception of the service guide, and sets reception for the service guide using the acquired information. Particularly, in an exemplary embodiment of the present invention, the Terminal 108 acquires NotificationEntry, NotificationPort, and NotificationAddress values necessary for reception of the general notification message in addition to the general setting. Thereafter, the Terminal 108 immediately receives the service guide in step 305. After receiving sufficient service guide data, the Terminal 108 displays the received service guide on its display for the user in step 306.

The Terminal 108 receiving the SGDD sets reception for the broadcast, and then receives the broadcast. Thereafter, the Terminal 108 exchanges the general notification message during the broadcast reception, and a broadcasting system for the message exchange will now be described below.

Figure 4:
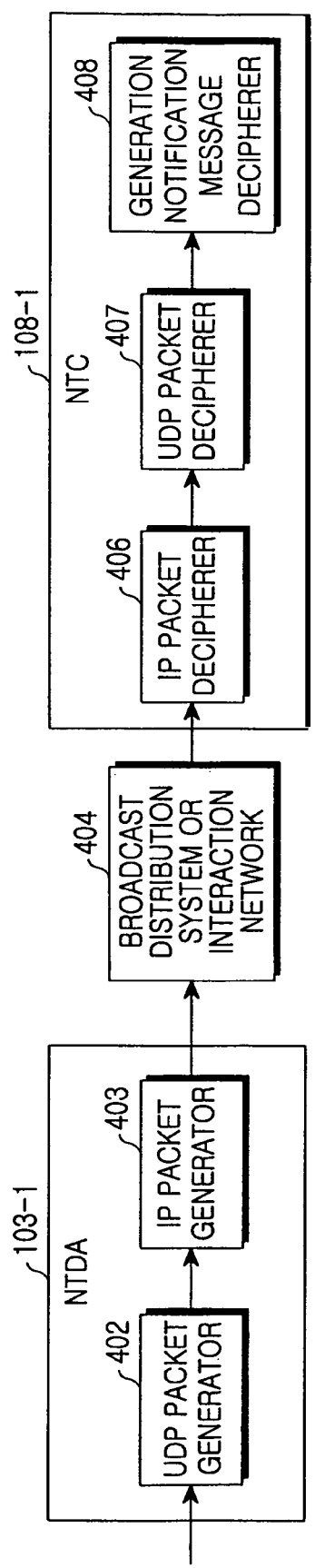
FIG. 4 is a block diagram illustrating a broadcasting system for transmitting a general notification message in a mobile broadcast system according to an exemplary embodiment of the present invention.

FIG. 4 is a block diagram illustrating a broadcasting system for transmitting a general notification message in a mobile broadcast system according to an exemplary embodiment of the present invention. A detailed structure of the Notification Distribution/Adaptation Function 103-1 and the Notification Client Function 108-1 of FIG. 1 is shown in the drawing. The Notification Client Function 108-1, one functional block of the Terminal 108, can be regarded as the Terminal 108.

Referring to FIG. 4, the Notification Distribution/Adaptation Function 103-1 serves to deliver a general notification message to a terminal or a terminal group, and includes a UDP packet generator 402 and an IP packet generator 403. The UDP packet generator 402, if there is a general notification message delivered from a Notification Event Function 102-1, generates a UDP packet using a notification port previously sent to the terminal through the SGDD, and then delivers the generated UDP packet to the IP packet generator 403. Herein, the notification port is a value set in a NotificationPort received through the SGDD. The reason why the general notification message is immediately input to the UDP layer is because when transport protocols of other upper layers are used, the size of the protocol headers is larger than the size of the message to be transmitted, thereby reducing the efficiency.

The IP packet generator 403 generates a packet using an IP address of the current ongoing session upon receipt of a notification indicating a UDP packet transmitted from the UDP packet generator 402. Although it is possible to send a general notification message simply with the UDP port number as described above, there is a need for a separate IP session in order to wake up the terminal from a sleep state and allow the terminal to receive the general notification message. This is because the terminal, when awaken from the sleep state, has no ongoing session. In consideration of this situation, the IP packet generator 403 not only generates a packet for an IP address of the current ongoing session, but also generates a packet using an IP address of the NotificationAddress, and transmits the generated packet.

The generated IP packets are transmitted to the Notification Client Function 108-1 via a Broadcast Distribution System or Interaction Network 404. Herein, the Broadcast Distribution System or Interaction Network 404 is shown in one block for convenience. That is, selection of the device 404 is made according to broadcast provider or system environment.

The Notification Client Function 108-1 deciphers the general notification message by decapsulating the IP packet data transmitted from the Notification Distribution/Adaptation Function 103-1. Therefore, the Notification Client Function 108-1 includes an IP packet decipherer 406, a UDP packet decipherer 407, and a general notification message decipherer 408.

The IP packet decipherer 406 determines whether an IP packet received via the Broadcast Distribution System or Interaction Network 404 corresponds to the current ongoing session or is designated a reception address of the general notification message. That is, if the IP packet corresponds to the NotificationAddress, the IP packet decipherer 406 generates a UDP packet by decapsulating an IP header, and delivers the generated UDP packet to the UDP packet decipherer 407. However, if the IP packet does not correspond to the NotificationAddress, the IP packet decipherer 406 discards the corresponding packet.

The UDP packet decipherer 407 delivers the UDP packet provided from the IP packet decipherer 406 to an upper layer only when the UDP packet corresponds to the current ongoing session. However, when the received UDP packet has previously had a previously-registered general notification message's port identification number through NotificationPort of the SGDD, the UDP packet decipherer 407 delivers the received UDP packet to the general notification message decipherer 408 without decapsulating the received UDP packet and delivering it to the upper layer. The general notification message decipherer 408 receives the decapsulated packet to decipher the general notification message, and determines a future operation of the terminal according to the deciphering result. The general notification message decipherer 408 can also be implemented in a controller.

Figure 5:
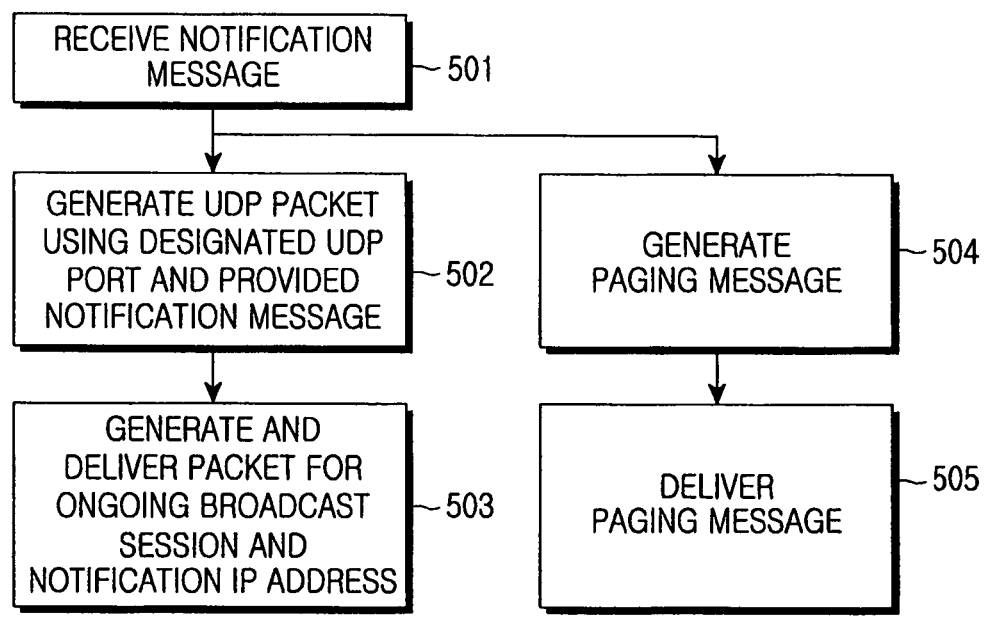
FIG. 5 is a flowchart illustrating a process of transmitting a general notification message in a mobile broadcast system according to an exemplary embodiment of the present invention.

With reference to FIG. 5, a description will now be made of a method for transmitting the general notification message according to an exemplary embodiment of the present invention.

FIG. 5 is a flowchart illustrating a process of transmitting a general notification message in a mobile broadcast system according to an exemplary embodiment of the present invention.

Referring to FIG. 5, a BCAST Service Distribution/Adaptation 103 receives a general notification message containing notification content from a Notification Event Function 102-1 in step 501. In step 502, the BCAST Service Distribution/Adaptation 103 then generates a UDP packet using a predetermined UDP port and the received general notification message. A format of the general notification message, as it is notified in the service provider level, is not directly related to transmission, so the corresponding general notification message is immediately generated into a UDP packet.

Meanwhile, the possibly exists of there being terminals in the sleep state that are connected to an Interaction Network 107 as shown in FIG. 4 or can receive a paging message upon receipt of the received general notification message, but their broadcast receiver is disabled. Therefore, the Terminal 108 in this state should wake up the sleeping broadcast receiver (not shown) by performing paging through the Interaction Network 107 or another method. To this end, the BCAST Service Distribution/Adaptation 103 generates a paging message for waking up the sleeping broadcast receiver in step 504, and sends the paging message through the Interaction Network 107 or another method in step 505, thereby waking up the sleeping broadcast receiver of the terminal.

A packet for carrying the general notification message is generated using a previously designated UDP port number, i.e. NotificationPort, for use of notification delivery. This is to allow the Terminal 108 to recognize the received packet as a general notification message. In step 503, the generated UDP packet is generated into an IP packet using an IP address of the current ongoing session or an IP address for delivery of the general notification message, i.e. NotificationAddress. A Notification Distribution/Adaptation Function 103-1 can acquire an IP address of the current ongoing session because it is managed by a part for transmitting a service in the BCAST Service Distribution/Adaptation 103. The generated IP packets are delivered to a transmitter of a lower layer. In this case, the general notification message can be repeatedly delivered to the transmitter of the lower layer several times according to the needs of the network provider or service provider, taking into account the situation in which there is a packet loss or a packet reception may fail.

Figure 6:
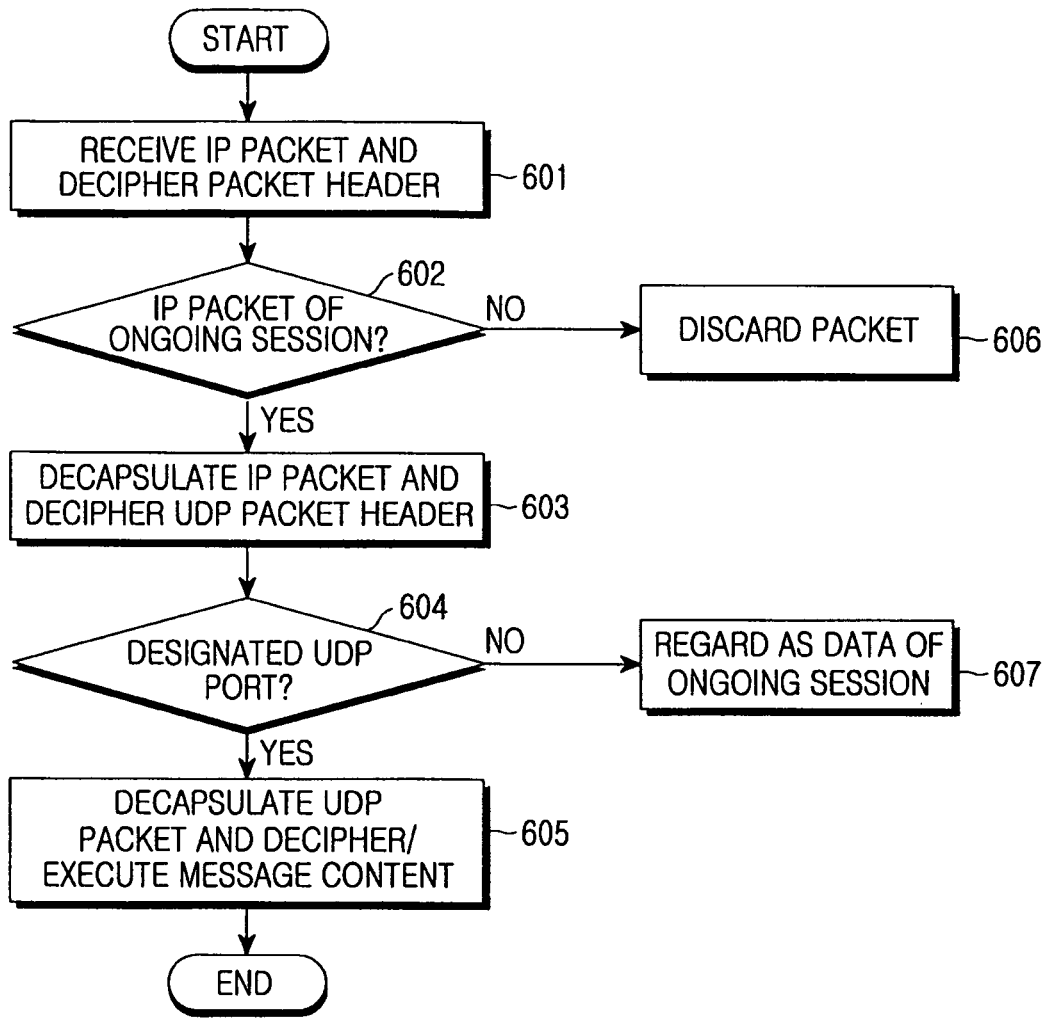
FIG. 6 is a flowchart illustrating a process of receiving a general notification message in a Notification Client Function of a mobile broadcast system according to an exemplary embodiment of the present invention.

FIG. 6 is a flowchart illustrating a process of receiving a general notification message in a Notification Client Function 108-1 of a mobile broadcast system according to an exemplary embodiment of the present invention.

Referring to FIG. 6, in step 601, a Notification Client Function 108-1 receives a received IP packet and deciphers a header of the IP packet. The Notification Client Function 108-1 determines in step 602 whether an IP address of the packet is identical to an IP address of the current ongoing session as a result of the header deciphering. The reason for performing the IP check is because the Notification Client Function 108-1 has no need to receive a packet that is irrelevant to the current ongoing session. Therefore, if an address of the IP header is different from an address of the current ongoing session as a result of the IP check, the Notification Client Function 108-1 discards the currently received packet in step 606.

However, if the address of the received IP packet is identical to the IP address of the current ongoing session, the Notification Client Function 108-1 proceeds to step 603 where it deciphers a header of an UDP packet obtained by decapsulating the IP packet. Thereafter, the Notification Client Function 108-1 determines in step 604 whether a UDP port number obtained by deciphering the header of the UDP packet is a designated UDP port by determining of it is identical to a port number predetermined through the SGDD as shown in FIG. 3. That is, the Notification Client Function 108-1 determines whether the received packet is a general notification message or a packet of a general broadcast session.

If it is determined in step 604 that the port number of the received UDP packet header is identical to the UDP port number designated to receive the general notification message, the Notification Client Function 108-1 decapsulates the received UDP packet to open a payload of the general notification message and deciphers the corresponding message to perform a necessary operation in step 605. However, if the port number of the received UDP packet is different from the pre-designated UDP port number, the Notification Client Function 108-1 proceeds to step 607 where it handles the received UDP packet, regarding it as a packet of the existing broadcast session.

Figure 7:
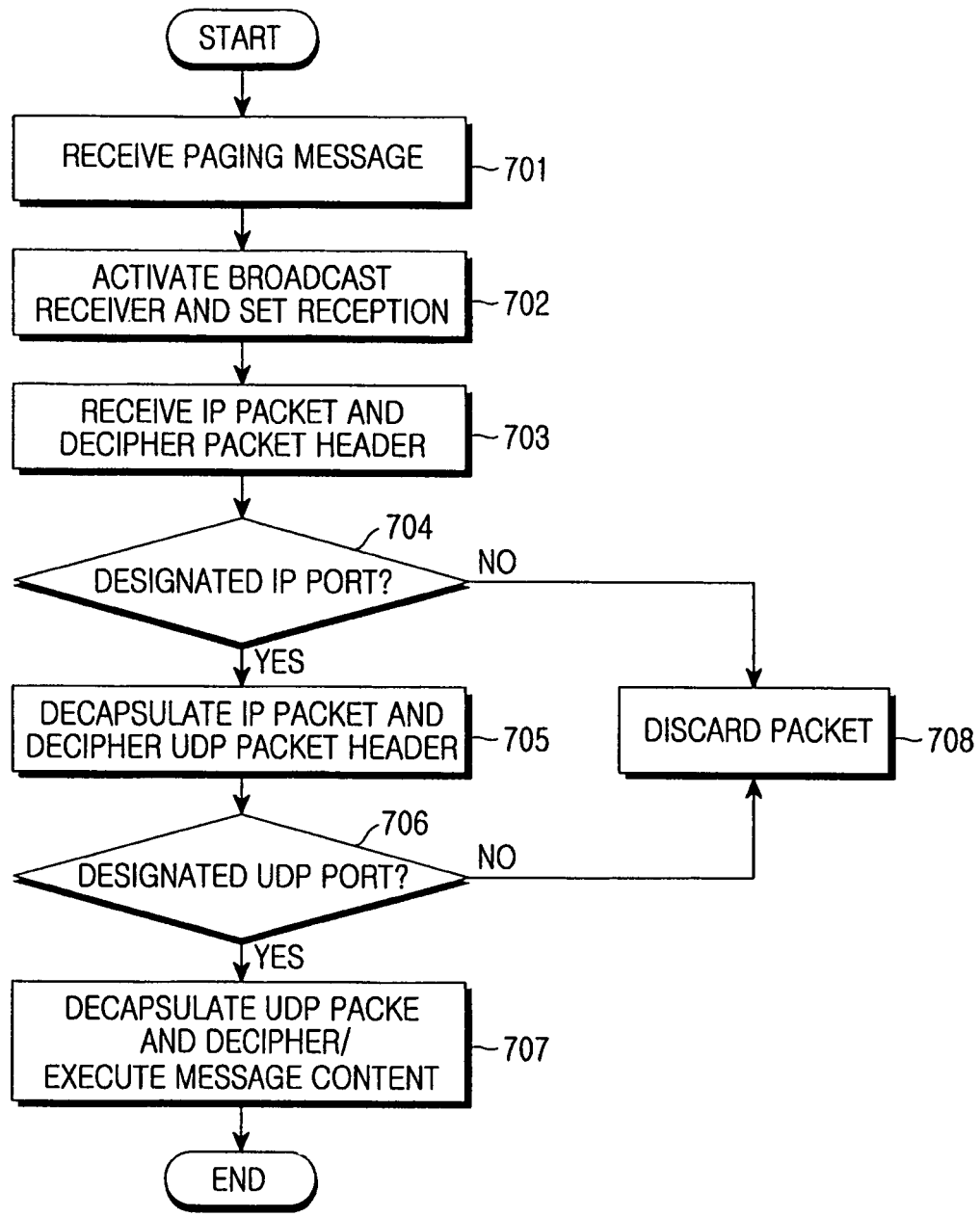
FIG. 7 is a flowchart illustrating a process of receiving a general notification message in a Notification Client Function when it is connected to an Interaction Network or a system having a sleeping terminal in a mobile broadcast system according to an exemplary embodiment of the present invention.

FIG. 7 is a flowchart illustrating a process of receiving a general notification message in a Notification Client Function 108-1 when it is connected to an Interaction Network 404 or a system having a sleeping terminal in a mobile broadcast system according to an exemplary embodiment of the present invention.

Referring to FIG. 7, in step 701, a Notification Client Function 108-1 receives a paging message according to a mechanism of the Interaction Network 404 or a paging mechanism of another method. In step 702, the Notification Client Function 108-1 activates a sleeping broadcast receiver through the paging message and prepares for reception. The reception preparation includes generating a session using NotificationPort and NotificationAddress transmitted through the SGDD, and entering a ready state. In step 703, the Notification Client Function 108-1 in the ready state deciphers a header of a received IP packet upon receipt of the IP packet from a Notification Distribution/Adaptation Function 103-1.

The Notification Client Function 108-1 determines in step 704 whether an address of the IP packet is identical to an IP address for a general notification message, designated from the NotificationAddress obtained through the SGDD. If it is determined that the address in a header of the IP packet is different from the address of the NotificationAddress, the Notification Client Function 108-1 discards the packet in step 708. However, if the IP address of the IP packet is identical to the IP address of the NotificationAddress, the Notification Client Function 108-1 deciphers a header of a UDP packet obtained by decapsulating the IP packet in step 705.

Thereafter, the Notification Client Function 108-1 determines in step 706 whether a UDP port number obtained by deciphering the header of the UDP packet is identical to a UDP port number of the NotificationPort obtained through the SGDD. Step 706 is performed to determine whether the received packet is a general notification message or a wrongly transmitted packet.

If it is determined in step 706 that the port number of the received UDP packet header is identical to the Notification-Port, i.e. the UDP port number designated to receive the general notification message, the Notification Client Function 108-1 decapsulates the UDP packet to obtain a payload of the message and deciphers the corresponding message to perform a necessary operation in step 707. However, if the port number of the received UDP packet is different from the port number of the NotificationPort, the Notification Client Function 108-1 discards the received UDP packet in step 708, regarding it as an incorrectly transmitted UDP packet.

A description will now be made of the specific notification message, or the second notification message.

Figure 8:
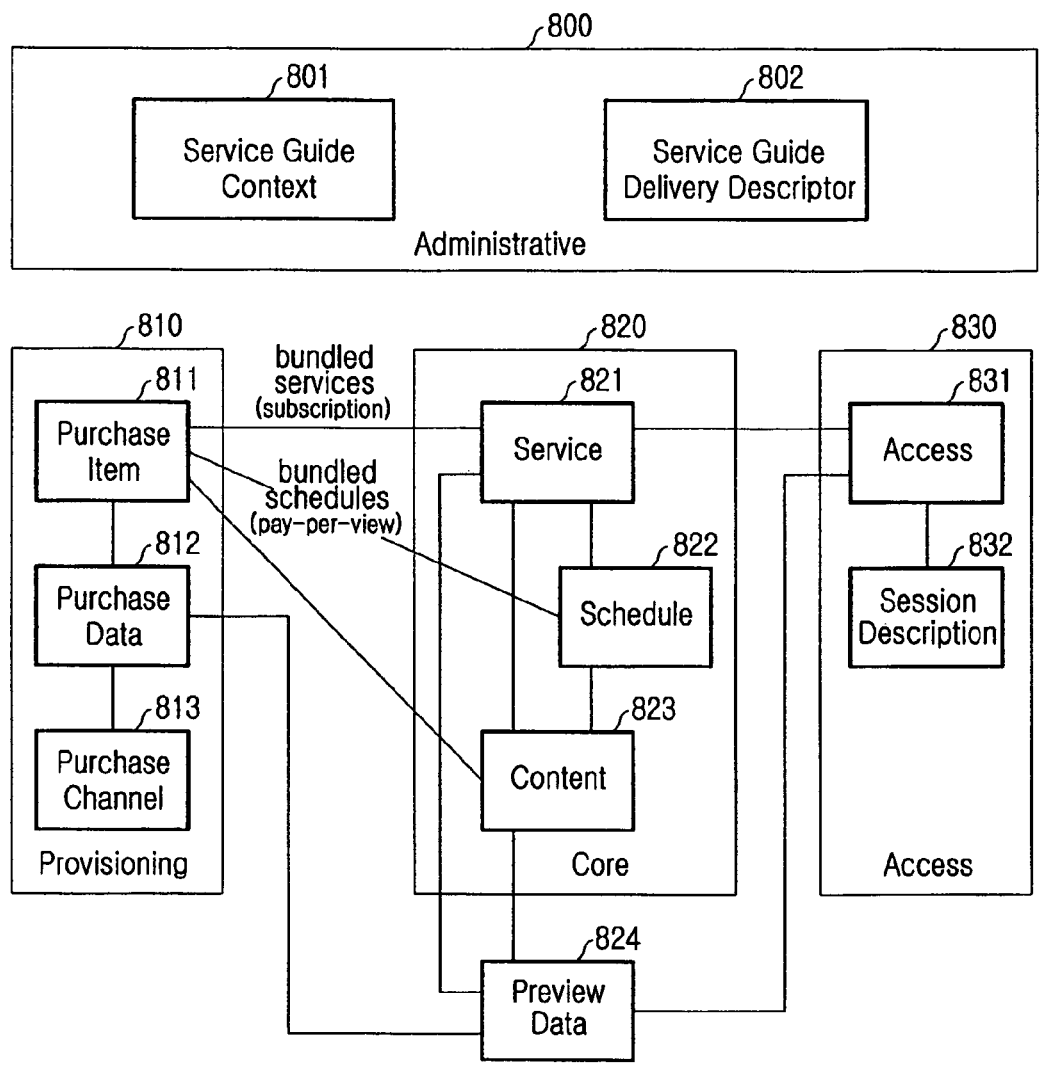
FIG. 8 is a diagram illustrating data model architecture of a service guide proposed for mobile broadcast in OMA BAC BCAST, one of the standard groups for mobile broadcast technology.

FIG. 8 is a diagram illustrating data model architecture of a service guide proposed for mobile broadcast in OMA BAC BCAST, one of the standard groups for mobile broadcast technology. In FIG. 8, each line connecting between fragments represents a mutual reference in each corresponding fragment.

Referring to FIG. 8, one service guide is composed of fragments having their unique object, and is divided into 4 large groups according to usage.

An Administrative group 800, a group for providing basic information available for receiving the service guide, is composed of a Service Guide Context 801 and a ServiceGuideDeliveryDescriptor 802. The Service Guide Context 801 provides identification information of a service provider that generated and transmitted a service guide identifier (ID) and a service guide, and information on the overall service guide. The ServiceGuideDeliveryDescriptor 802 provides the terminal with information on the channel capable of receiving a plurality of service guide fragments, and scheduling information and update information for the channel so that the terminal can receive only the necessary service guide at an appropriate time.

A Provisioning group 810, a group for providing fee information for service reception, is composed of a Purchase Item 811, Purchase Data 812, and a Purchase Channel 813. The Purchase Item 811 provides fee information for services or a service bundle, and the Purchase Data 812 provides information indicating for which method the service user can pay the fee. The Purchase Channel 813 provides information on the system from which the service user can actually purchase a service.

A Core group 820, a group for providing information on the service itself, is composed of Service 821, Schedule 822, and Content 823. The Service 821 provides a description of the service itself that the user will receive, and information indicating with which content the service can be configured. The Schedule 822 provides information on the time in which the service can be provided and used. The Content 823 provides information on each of a plurality of contents constituting the service.

An Access group 830 is composed of Access 831 and Session Description 832, and provides service access information indicating how to receive services of the Core group 820, and detailed information on the session where the content constituting the service are transmitted, so as to enable the terminal to access the service. The Access 831 provides the terminal with a plurality of access methods for one service so as to provide a method in which the terminal can access several additional services based on one service. The Session Description 832 provides session information for the service transmitted by the service access defined in one access fragment.

Aside from the 4 groups, there is a Preview Data fragment 824, and the Preview Data fragment 824 provides previews and icons for service and content.

Table 3 to Table 11 show detailed content of the access fragment currently defined in OMA BCAST.

TABLE 3

| Name | Type | Category | Cardinality | Description | Data Type |
|------|------|----------|-------------|-------------|-----------|
| Access | E | O | 0 . . . N | Access fragment Contains the following attributes: id version validFrom validTo ServiceProtection AudioLanguage Contains the following sub-elements: AccessType ExtensionURL ServiceIDRef ScheduleIDRef UsageInfo AlternativeAccessURL TerminalCapabilityRequirement BandwidthRequirement ApplicationSpec MediaInformation | |

TABLE 3-continued

| Name | Type | Category | Cardinality | Description | Data Type |
|---|---|---|---|---|---|
| id | A | M | 1 | ID of the Access fragment, globally unique | anyURI |
| version | A | M | 1 | Version of this fragment. The newer version overrides the older one as soon as it has been received. | unsigned Int (32 bits) |
| validFrom | A | O | 0 . . . 1 | The first moment when this fragment is valid. If not given, the validity is assumed to have started at some time in the past | Integer (32 bits) expressed as NTP time |

TABLE 4

| Name | Type | Category | Cardinality | Description | Data Type |
|---|---|---|---|---|---|
| validTo | A | O | 0 . . . 1 | The last moment when this fragment is valid. If not given, the validity is assumed to end in undefined time in the future. | Integer (32 bits) expressed as NTP time |
| ServiceProtection | A | O | 0 . . . 1 | If true, this indicates that this access related to the associated service is protected by OMA BCAST Service Poretection; if false, this indicates that this access related to the associated service is not protected by OMA BCAST Service Protection. | Boolean |
| AudioLanguage | A | O | 0 . . . 1 | This attribute describes the language used in the audio stream if the Access type relates to an A/V access. Note: The language information could be given for each audio stream in SDP that describes all language options. But current media players do not offer APIs for language selection. | Language |
| AccessType | E1 | M | 1 | Defines the type of access. Contains the following attribute: TransmissionMedia Contains the following elements: BroadcstTransmission InteractiveTransmissionScheme | |

TABLE 5

| Name | Type | Category | Cardinality | Description | Data Type |
|---|---|---|---|---|---|
| Transmission_Media | A | M | 1 | This attribute indicates which channel is used for the delivery of service. 0: Broadcast Channel 1: Interaction Channel | Integer |
| Broadcast Transmission | E2 | O | 0 . . . 1 | This element is used for the indication of IP transmission. Contains the following attribute: IP_Address Contains the following elements: SessionDescriptionReference SDP | |
| IP_Address | A | O | 0 . . . 1 | Receiver IP address of IP stream, which transport A Service over Broadcast channel. Note: This attribute is used when SDP is not included in Access Fragment. If SDP in Access Fragment exists, IP address of the receiver IP address in SDP is used. | String |

TABLE 6

| Name | Type | Category | Cardinality | Description | Data Type |
|---|---|---|---|---|---|
| Session Description Reference | E3 | O | 0...1 | The reference to the SessionDescription this access relates to.<br>Note: the SessionDescription itself may be delivered in two ways via broadcast or via fetch over interaction channel.<br>In the case of broadcast delivery, the SessionDescription is either delivered in SGDU or encapsulated in this Access fragment. In the latter case, this element is not used but the SDP element is used instead.<br>In the case of fetch over interaction channel, the SessionDescription can be acquired by accessing the URI (given as attribute of this element).<br>Attributes:<br>Type<br>URI<br>id | Session Description Reference |

TABLE 7

| Name | Type | Category | Cardinality | Description | Data Type |
|---|---|---|---|---|---|
| Type | A | M | 1 | Type of the session description referred by this SessionDescriptionReference<br>1 - SDP<br>2 - MBMS User Service Description (MBMS-USD) as specified in [26.346] section 5.2. It may contain one or several SDP descriptions. | Integer |
| URI | A | O | 0...1 | The URI to the file containing SessionDescription that the media application in the terminal uses to access the service. | Any URI |
| idRef | A | O | 0...1 | The id of the SessionDescription fragment this access refers to, globally unique | Any URI |
| SDP | E3 | O | 0...1 | A session description in SDP (IETF session description protocol) format | String (in SDP format) |
| Interactive Transmission Scheme | E2 | O | 0...1 | This element indicates which communication system or protocol is used for Interaction Channel.<br>Containing the following attribute:<br>TansmissionSchemeType<br>Contains the following elements:<br>AccessServerIPaddress<br>AccessServerURL<br>AccessServerPhoneNumber | |

TABLE 8

| Name | Type | Category | Cardinality | Description | Data Type |
|---|---|---|---|---|---|
| Transmission Scheme Type | A | M | 1 | 1: Interaction Channel provided by Interaction network<br>2: MMS<br>3: WAP 1.0<br>4: WAP 2.x<br>5: SMS<br>6: HTTP<br>7: Voice Call<br>8: Service Provider defined Transmission Scheme<br>Note: Other protocol or communication system May be added based on OMA Service interaction function. | Integer |

TABLE 8-continued

| Name | Type | Category | Cardinality | Description | Data Type |
|---|---|---|---|---|---|
| AccessServer IPaddress | E3 | O | 0...N | IP address of Sever, which provides different access(over Interaction Channel) of a Service | String |
| AccessServer URL | E3 | O | 0...N | ULR of Server, which provides different access (over Interaction Channel) of a Service | Any URI |
| AccessServer PhoneNumber | E3 | O | 0...N | Phone number of Server, which provides different access (over Interaction Channel) of a Service, Note: MMS and SMS use phone number as an address. | Integer |
| Extension URL | E1 | O | 0...N | URL containing additional information related to this fragment in a web page. The terminal can fetch further information by accessing this URL. | Any URI |

TABLE 9

| Name | Type | Category | Cardinality | Description | Data Type |
|---|---|---|---|---|---|
| ServiceID Ref | E1 | O | 0...N | Reference to the service fragment(s) to which the access fragment belongs. Either one of ServiceIDRef or ScheduleIDRef but not both SHALL be specified. Note: Implementation in XML Schema using <choice>. Each Service fragment SHALL be associated to at least one Access fragment to enable the terminal access the Service. | anyURI |
| ScheduleID Ref | E1 | O | 0...N | Reference to the schedule fragment(s) to which the access fragment belongs. This provides a reference to a Schedule fragment to temporarily override the default Access fragment of the Service addressed by the Schedule. Either one of ServiceIDRef or ScheduleIDRef but not both SHALL be specified. Note: Implementation in XML Schema using <choice>. | anyURI |
| UsageInfo | E1 | O | 0...N | This text helps the user understand what difference it makes to use one or the other access fragment. It's mandatory in case more than one access fragment is available at a given point in time. Possibly in multiple languages. The language is expressed using built-in XML attribute xml:lang with this element. | String |

TABLE 10

| Name | Type | Category | Cardinality | Description | Data Type |
|---|---|---|---|---|---|
| Alternative AccessURL | E1 | O | 0...N | Specify alternative URL of the content for retrieving it via the interaction channel if the content cannot be received via the broadcast channel. For example, due to the bad radio environment, or a terminal is out of the service area. | Any URI |
| TerminalCapability Requirement | E1 | O | 0...1 | Specification of required terminal capabilities for this access, such as protocols, codecs, bitrate, processing, memory; UAprof is used for expressing the capabilities | String |
| Bandwidth Requirement | E1 | O | 0...1 | Specification of required network bandwidth to access described in this fragment; A broadcast service can include multiple accessible streams (same content) with different bandwidth, so that the terminal | Integer |

TABLE 10-continued

| Name | Type | Category | Cardinality | Description | Data Type |
|---|---|---|---|---|---|
| | | | | can make a choice depending on its current reception condition. | |
| Application Spec | E1 | O | 0...N | Application type that can consume the service using this access spec defined by MIME type | String |
| MediaInformation | E1 | O | 0...N | Optional reference to an icon, pictogramme, animation or audio. PreviewData or reference to PreviewData is used here. Attributes: usage idRef | |

TABLE 11

| Name | Type | Category | Cardinality | Description | Data Type |
|---|---|---|---|---|---|
| Usage | A | M | 1 | Possible values: background, icon (e.g.) | Integer (8 bits) |
| idRef | A | M | 1 | ID of the PreviewData fragment | anyURI |
| <proprietary elements/attributes> | E1 or lower, A | O | 0...N | Any number of proprietary or application-specific elements or attributes that are not defined in this specification. | |
| Notification Entry | E1 | M | 1 | An entry for Notification Message in the Service Guide Delivery Descriptor. | |
| Notification Port | A | M | 1 | Port of Notification Message delivery | |
| Notification Address | A | O | 1 | IP address of Notification Message delivery | |

A description of 'Category' in Table 3 to Table 11 is equal to the description of that in Table 1 and Table 2, and a detailed description of Table 3 to Table 11 is disclosed in a description document OMA-TS-TS-BCAST_ServiceGuide-V1_0_0-20050930-D available from Open Mobile Alliance, the entire disclosure of which is hereby incorporated by reference. The reference document was the latest version at the time that this specification was written, and if the document was updated thereafter, the exemplary embodiment of the present invention can be applied to the updated version.

In Table 3 to Table 11, the last 3 items are newly defined herein for the notification defined in Table 1 and Table 2. An element NotificationEntry has two attributes of NotificationPort and NotificationAddress. The NotificationPort and NotificationAddress indicate information on the channel through which the terminal can receive the notification message. The use of IP as a data transmission technology for a mobile broadcast is discussed below. If a method, in which the terminal can receive the notification message on the assumption that the IP is used, provides information on the IP address to which the notification message is to be delivered, and provides information on a UDP port number on the assumption that UDP is used over IP, then the terminal can receive the notification message. The reason for using the UDP is as follows. Although other transport protocols such as TCP can also be used, a header of the UDP transport protocol has less overhead and does not support reception acknowledgement. Thus, the UDP transport protocol is appropriate for the characteristics of the unidirectionally transmitted broadcast service.

NotificationPort has a UDP port number previously allocated such that the network provider or service provider uses the UDP port number when it sends the notification message for a specific service. The terminal, receiving a message transmitted via a UDP port designated for use of the notification message, can immediately recognize the corresponding packet as a notification message and processes the packet, because it is aware of the UDP port for the notification message through the access fragment. Because the access fragment exists for each service, NotificationPort in the access fragment enables the receiving of a notification message for the corresponding service.

The Notification Event Function 102-1 or the Notification Distribution/Adaptation Function 103-1 of FIG. 1 is available as an entity for generating a delivery message in order to deliver the notification message. An apparatus for generating the delivery message has information on all the ongoing sessions. That is, it is possible to attach the notification message to a notification-requiring transport session, i.e. a session of a specific service connected to an arbitrary access fragment, without generating a separate new session. A basic identification unit of the session is composed of an IP address, and the notification message uses an IP address of a session of the ongoing service connected to the notification-requiring access fragment. Because the mobile broadcast system delivers the notification message through the ongoing specific IP session by simply differentiating the UDP port, the terminal can immediately receive the notification message related to the current ongoing session without the need to separately monitor the session. The NotificationPort can be used when the terminal is receiving the mobile broadcast service and desires to deliver the notification message through an IP flow (or IP transport path) where the mobile broadcast service is being transmitted.

The NotificationAddress is used when there is an intention to allocate a dedicated IP address during delivery of the notification message and to deliver the notification message through a flow (or transport path) having the IP address. The NotificationAddress provides an IP address in order to deliver the notification message for the specific service connected to the access fragment to the terminal receiving the mobile broadcast service or the terminals in the idle mode, not receiving the mobile broadcast service to save power. The terminal scheduled to receive the notification message has information of the NotificationPort sand the NotificationAddress, and receives the notification message as the entity desiring to deliver the terminal's situation or the notification message sets a reception address of the notification message.

Figure 9:
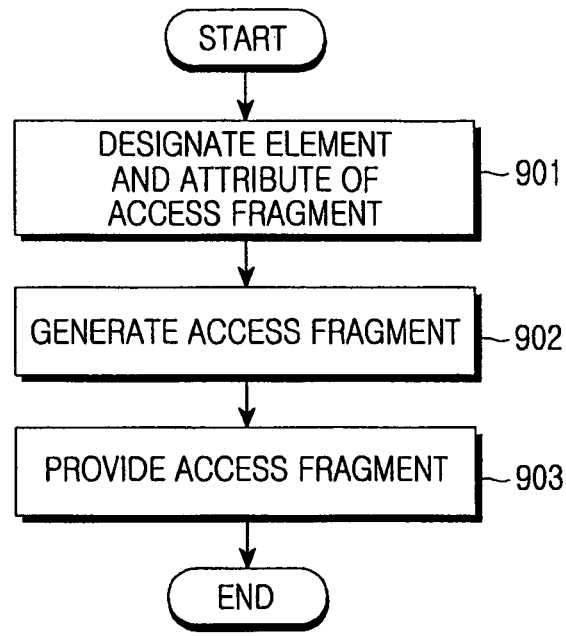
FIG. 9 is a flowchart illustrating a method for generating and transmitting an access fragment in a mobile broadcast system according to an exemplary embodiment of the present invention.

FIG. 9 is a flowchart illustrating a method for generating and transmitting an access fragment in a mobile broadcast system according to an exemplary embodiment of the present invention.

Referring to FIG. 9, a BCAST Service Distribution/Adaptation 103 designates elements and attributes of an access fragment to be delivered to a Terminal 108 in step 901. Particularly, in step 901, the NotificationEntry, NotificationPort, and NotificationAddress values according to an exemplary embodiment of the present invention are designated. Herein, the elements and attributes of the access fragment are previously determined according to a broadcast provider or system environment. After step 901, the BCAST Service Distribution/Adaptation 103 generates the access fragment in step 902. Thereafter, in step 903, the BCAST Service Distribution/Adaptation 103 provides the access fragment generated in step 902, to the Terminal 108.

Figure 10:
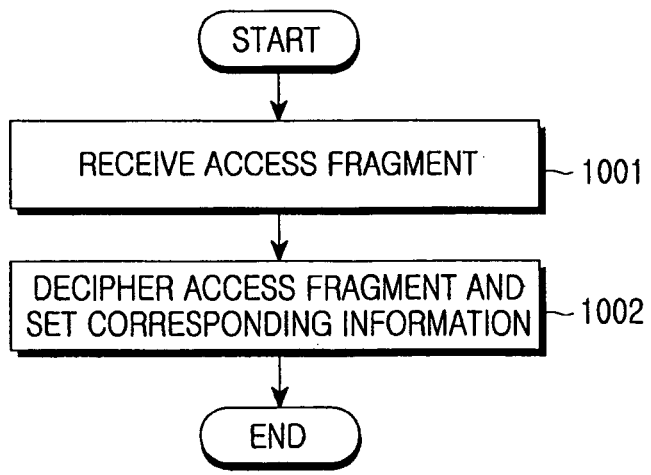
FIG. 10 is a flowchart illustrating a method for receiving and processing an access fragment in a Terminal of a mobile broadcast system according to an exemplary embodiment of the present invention.

FIG. 10 is a flowchart illustrating a method for receiving and processing an access fragment in a Terminal 108 of a mobile broadcast system according to an exemplary embodiment of the present invention.

Referring to FIG. 10, a Terminal 108 receives an access fragment through its receiver in step 1001. In step 1002, the Terminal 108 receiving the access fragment deciphers the access fragment to acquire information available for receiving a specific service associated with the access fragment, and sets reception for the specific service using the acquired information. Particularly, in an exemplary embodiment of the present invention, the Terminal 108 acquires NotificationEntry, NotificationPort, and NotificationAddress values necessary for reception of the notification message in addition to the general setting.

The Terminal 108 receiving the access fragment receives the specific service after setting reception for the specific service. Thereafter, the Terminal 108 transmits/receives a notification message during reception of the specific service, and a broadcast system for this will be described below.

A procedure for delivering the notification message associated with the access fragment is equal to that described in FIG. 5, but the NotificationPort and NotificationAddress used should be the values applied only for the service connected to the access fragment rather than the values used for general purpose. The above values are determined by the service provider or the network provider.

An operation of the Terminal 108 for receiving the notification message for the specific service through the access fragment is equal to that described in FIGS. 6 and 7, so a description thereof will be omitted.

Figure 11:
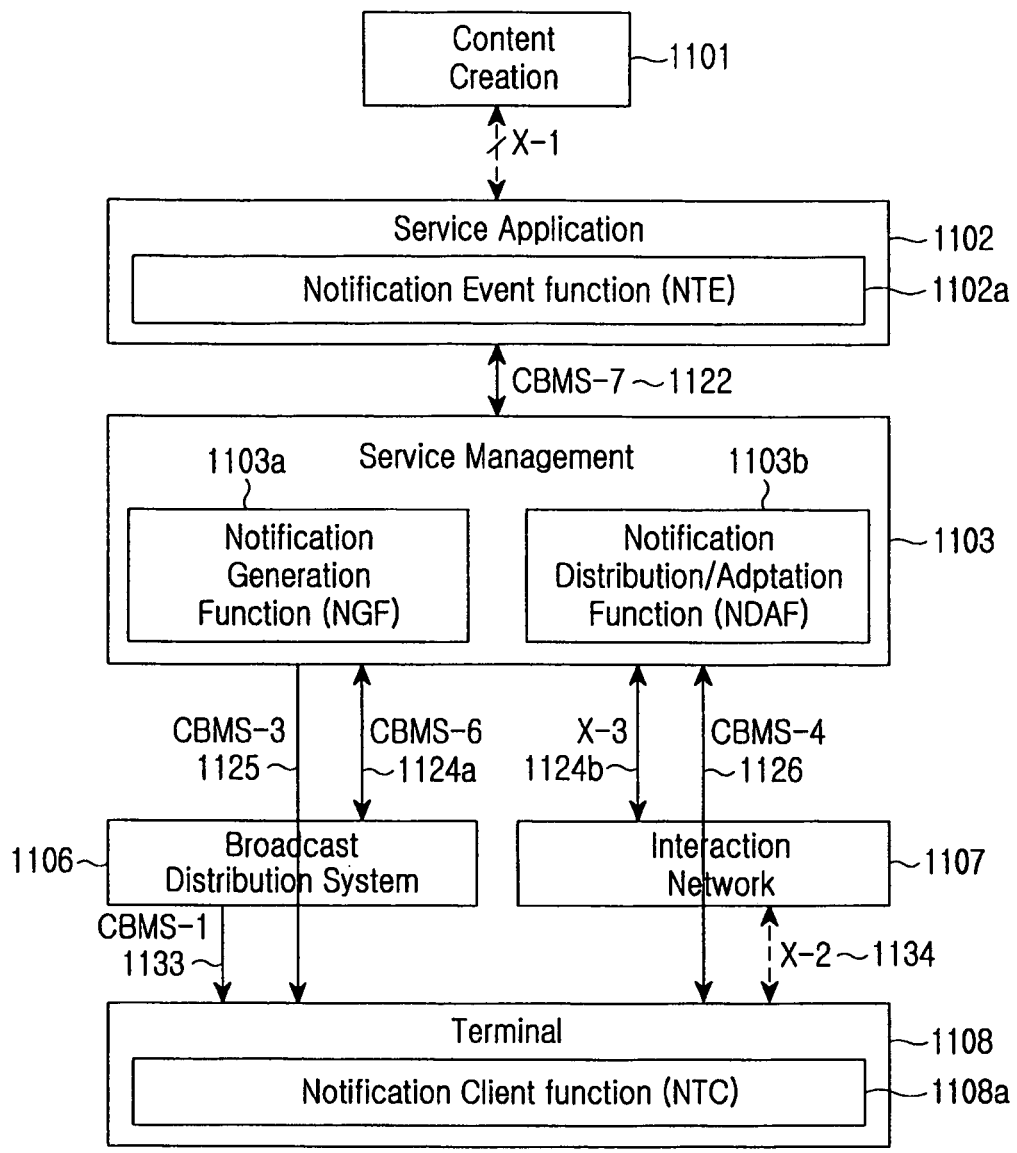
FIG. 11 is a diagram illustrating Digital Video Broadcasting-Convergence of Broadcasting and Mobile Service (DVB-CBMS) network architecture according to a second exemplary embodiment of the present invention.

FIG. 11 is a diagram illustrating Digital Video Broadcasting-Convergence of Broadcasting and Mobile Service (DVB-CBMS) network architecture according to a second exemplary embodiment of the present invention.

Referring to FIG. 11, a Content Creation (CC) 1101 is a provider of a BCAST service, and the BCAST service can include the audio/video broadcast service, file (music file or data file) download service, etc. The Content Creation 1101, if there is any problem in providing the BCAST service or any change in service content, notifies the problem or change to a Notification Event Function (NTE) 1102a in a BCAST Service Application 1102. The Notification Event Function 1102a delivers a notification message event to a Notification Generation Function (NGF) 1103a based on the received event.

The BCAST Service Application 1102 has a function of receiving content data for the BCAST service provided from the Content Creation 1101, handling the received content data in the form (for example, audio/video streaming or movie downloading) appropriate for the broadcast network, and generating BCAST service data. For example, the BCAST Service Application 1102 has a function of generating standardized metadata necessary for a broadcast guide, and has a function of generating billing information according to a user. In addition, the BCAST Service Application 1102 receives a change in the BCAST service, notified by the Content Creation 1101, delivers a notification event to the Notification Generation Function 1103a located in a Service Management (SM) 1103, and provides service guide attribute information used for the generation of a notification message to the Notification Generation Function 1103a.

The Service Management 1103 has a function of determining a transmission schedule for the BCAST service provided from the BCAST Service Application 1102, and a function of generating a service guide. The Service Management 1103 is connected to a Broadcast Distribution System 1106 capable of the BCAST service, and an Interaction Network 1107 supporting interaction communication. In addition, the Service Management 1103, including therein a Notification Distribution/Adaptation Function (NTDA) 1103b, receives a notification message from the Service Management 1103 and transmits the notification message to one terminal or one group of terminals via the Broadcast Distribution System 1106 or the Interaction Network 1107. The Service Management 1103 has session information needed by the Notification Generation Function 1103a to generate a notification message for use by a terminal, and the Notification Distribution/Adaptation Function 1103b transmits the session information to the Notification Generation Function 1103a.

The Service Management 1103 manages subscriber information for reception of the BCAST service, service provisioning information such as the information indicating whether the subscriber has purchased the related content, and device information for terminals receiving the BCAST service. That is, the Service Management 1103 provides user billing information to the BCAST Service Application 1102. The Service Management 1103 also provides the subscription information, the service provisioning information and the device information to the Broadcast Distribution System 1106 and the Interaction Network 1107. In particular, the Service Management 1103, as it includes the Notification Generation Function 1103a, generates a notification message for the notification event or generates a notification message for the information indicating that content is provided from the BCAST service, when there is an event that occurred indicating the addition of a new function or a change in the existing function, provided from the Content Creation 1101, the BCAST Service Application 1102, the Service Management 1103 and the Broadcast Distribution System 1106. For example, the notification message can be associated with a self event indicating the information that the corresponding broadcast will be provided after a lapse of a certain amount of time.

The Broadcast Distribution System 1106 is a network for transmitting the BCAST service. In this exemplary embodiment, the Broadcast Distribution System 1106 is based on DVB-H, by way of example. The Broadcast Distribution System 1106, if a change occurs in the process of transmitting the BCAST service, notifies the change to the Service Management 1103 via a CBMS-6 interface 1124a or an X-3 interface 1124b.

The Interaction Network 1107 transmits BCAST services on a point-to-point basis, or interactively exchanges control information and additional information related to the reception of the BCAST services, and can be the existing cellular network such as 3GPP Wideband Code Division Multiple Access (WCDMA) network.

A Terminal 1108 is a terminal device capable of receiving the BCAST service, and may have the function of accessing the Interaction Network 1107 using an interaction channel according to capabilities of the terminal apparatus. It is assumed herein that the Terminal 1108 is a terminal capable of accessing the cellular network, as an example of the Interaction Network 1107, via X-2 1134. The Terminal 1108 receives a notification message transmitted by a Notification Client Function (NTC) 1108a via a CBMS-3 interface 1125, and performs an appropriate operation according to the received notification message. Alternatively, the Terminal 1108 receives a notification message transmitted via a CBMS-4 interface 1126, and performs an appropriate operation according to the received notification message.

Next, a description will be made of interfaces between the block elements of the mobile broadcast system according to the second exemplary embodiment of the present invention.

A CBMS-7 interface 1122, an interface between the Notification Event Function 1102a located in the BCAST Service Application 1102 and the Notification Generation Function 1103a of the Service Management 1103, carries information (for example, attribute information of the service guide) necessary for generation of notification or notification message for an event so that the Notification Generation Function 1103a can generate a notification message.

The CBMS-5 interface 1125, an interface used when a notification message transmitted from the Notification Distribution/Adaptation Function 1103b of the Service Management 1103 is directly delivered to the Terminal 1108 through a broadcast channel via the Broadcast Distribution System 1106, is used for transmitting the notification message to one or a plurality of terminals 1108.

The CBMS-4 interface 1126, an interface used when a notification message transmitted from the Notification Distribution/Adaptation Function 1103b of the Service Management 1103 is directly delivered to the Terminal 1108 through a dedicated channel to the Terminal 1108 via the Interaction Network 1107, or through a broadcast channel provided by the Interaction Network 1107, is used for transmitting the notification message to one or a plurality of terminals 1108.

The CBMS-6 interface 1124a, an interface between the Service Management 1103 and the Broadcast Distribution System 1106, is used as a transmission path to be used by the Service Management 1103 in the Broadcast Distribution System 1106, or a reception path of the event information generated in the Broadcast Distribution System 1106.

The X-3 interface 1124b is an interface used for setting up a transmission path to be used between the Service Management 1103 and the Interaction Network 1107.

A CBMS-1 interface 1133 is an interface used when a control signal of the Broadcast Distribution System 1106 is delivered to the Terminal 1108. For example, in DVB-H, a control signal called Program Specific information/Service information (PSI/SI) corresponds to the control signal.

An X-2 interface 1134 is an interface between the Interaction Network 1107 and the Terminal 1108.

The Notification Event Function 1102a has a function of delivering the information necessary for generating a notification message to the Notification Generation Function 1103a, and upon detecting the occurrence of a notification-requiring event, delivers information on the event to the Notification Generation Function 1103a. The Notification Generation Function 1103a generates a notification message using the information and event necessary for generating a notification message, received from the Notification Event Function 1102a. When the Notification Event Function 1102a receives a notification event from the Broadcast Distribution System 1106 via the Notification Distribution/Adaptation Function 1103b, it generates a notification message and transmits the notification message to the Notification Distribution/Adaptation Function 1103b. In the process of generating the notification message, if there is a need to re-indicate a start of the service, the Notification Generation Function 1103a receives a notification indicating a change in the service information from the Content Creation 101, defining one case where there is a need for transmitting a new mobile broadcast guide and another case where a particular event occurs in the Broadcast Distribution System 1106.

The Notification Distribution/Adaptation Function 1103b serves to transmit a notification message via the CBMS-5 interface 1125 or the CBMS-4 interface 1126, and to deliver a notification event indicating a change in the information on a particular mobile broadcast service from the Broadcast Distribution System 1106 to the Notification Generation Function 1103a. Herein, the change in the information on the broadcast service can include adjustment of a data rate or unavailability of the service due to wireless network environment.

Figure 12:
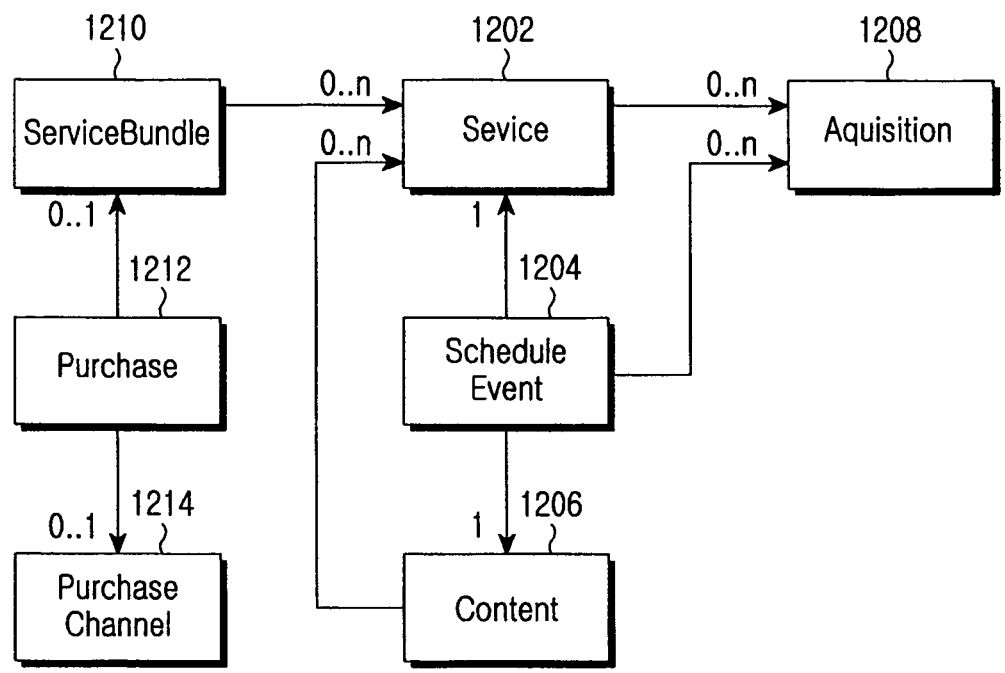
FIG. 12 is a diagram illustrating an Electronic Services Guide (ESG) data model in DVB-CBMS according to a second exemplary embodiment of the present invention.

FIG. 12 is a diagram illustrating an Electronic Services Guide (ESG) data model in DVB-CBMS according to a second exemplary embodiment of the present invention.

Referring to FIG. 12, each block represents a fragment of ESG data. That is, the ESG data model includes a Service fragment 1202, a Schedule Event fragment 1204, a Content fragment 1206, an Acquisition fragment 1208, a Service Bundle fragment 1210, a Purchase fragment 1212, and a Purchase Channel fragment 1214.

The Service fragment 1202 includes the full description of the service. The Schedule Event fragment 1204 represents information on the service according to time. The Acquisition fragment 1208 includes service access information that needs to be known to receive service data The Service Bundle fragment 1210 includes information on the case where several services are grouped into one service bundle. The Purchase fragment 1212 indicates price information for purchase of the service bundle. The Purchase Channel fragment 1214 indicates information on the system that should be used to acquire a right for the purchase.

Each fragment of the data model can make reference to other fragments, and an arrow between the fragments represents relationship of the reference. The phrase "making reference" refers to a process in which the current fragment provides information associated therewith using the information delivered from another fragment. That is, when one service is composed of several contents, the Service fragment 1202 includes only the full description of the service, for example, name and language of the service, but includes no description of the content transmitted through the service.

However, the Content fragment 1206 of the corresponding content makes reference to the service fragment of the corresponding service. In addition, in order to acquire a variety of information necessary for receiving the service, e.g. session information used for the transmission protocol, the terminal can acquire the information by receiving the Acquisition fragment 1208 to which the Service fragment 1202 is making reference, and demodulating the received Acquisition fragment 1208.

The ESG data is delivered to the terminal using a separate IP stream at a time different from that of the actual data stream. Therefore, the service provider can provide, before service delivery, the information that the user should acquire before it receives the service, using the ESG data model. By receiving the ESG stream, the terminal acquires the information necessary for receiving the service provided by the service provider, and when the user selects a specific service, the terminal accesses the data stream where the service is delivered, using the acquired information, and then receives data. The information needed by the terminal to access the service data stream is transmitted through the Acquisition fragment 1208 as described in FIG. 11.

In the ESG data model, several fragments are bundled and contained in one container, and each container is regarded as one object in a FLUTE session during its transmission.

Figure 13:
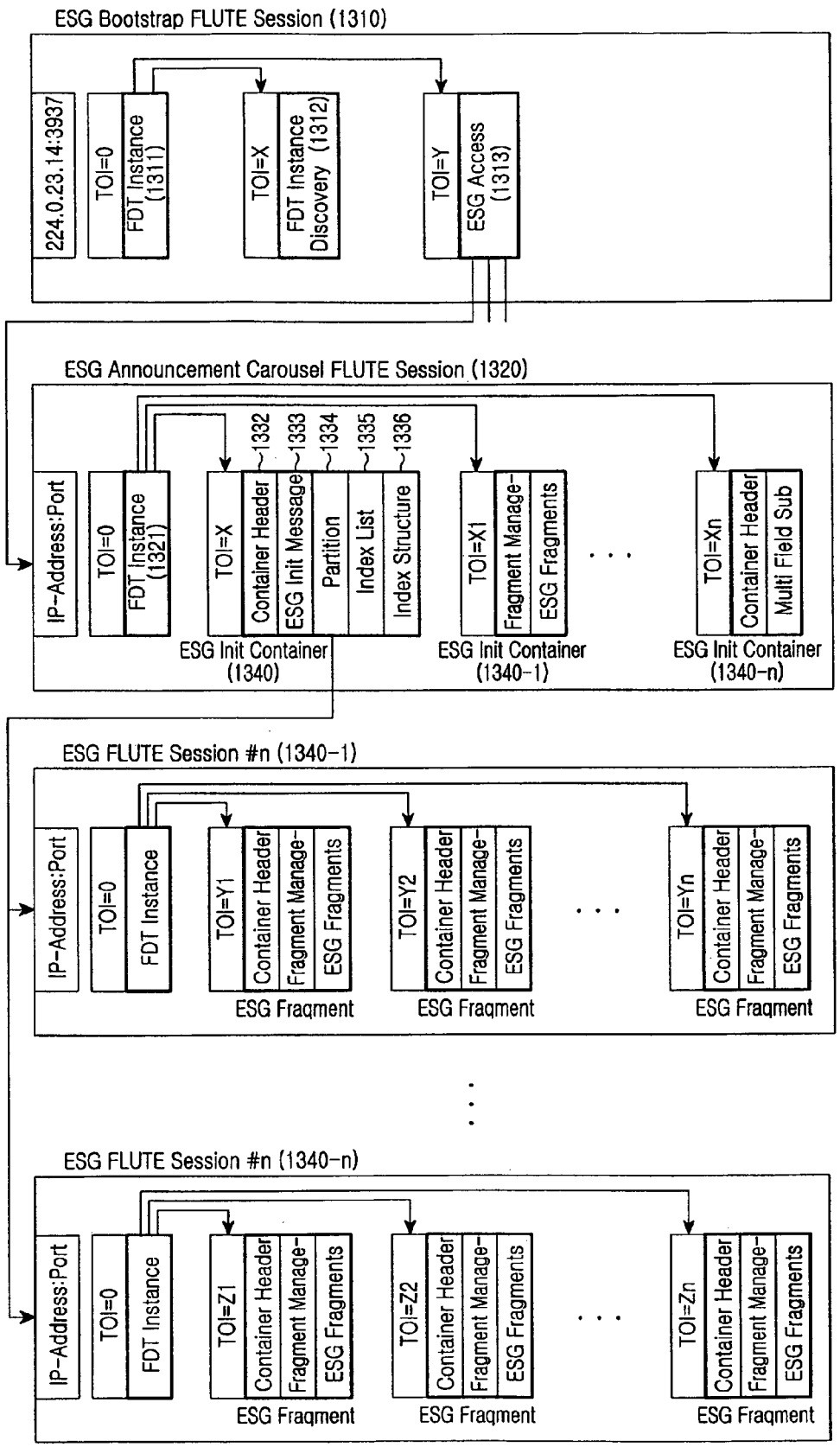
FIG. 13 is a diagram illustrating an ESG delivery operation in DVB-CBMS according to the second exemplary embodiment of the present invention.

FIG. 13 is a diagram illustrating an ESG delivery operation in DVB-CBMS according to the second exemplary embodiment of the present invention.

Referring to FIG. 13, a transmitter provides channel information of a bootstrapping session 1310 of an ESG to a terminal through a PSI/SI signal, for delivery of the ESG. The terminal accesses a channel according to the channel information, and then receives bootstrapping information. The bootstrapping information is composed of an ESG Provider Descriptor 1312 and an ESG Access Descriptor (or ESG Bootstrap Descriptor) 1313. A File Description Table (Full FDT) Instance 1311 is an FDT used in a FLUTE protocol, and this is a table including the parameters describing file objects transmitted in an FLUTE session.

The ESG Provider Descriptor 1312 includes related information such as ID, name and logo of an ESG provider, and the ESG Access Descriptor 1313 includes information on an ESG Announcement channel 1320, information on the number of IP sessions where the ESG is delivered, and address information of the IP sessions.

The ESG Announcement channel 1320 carries an ESG Initialization Container 1340 and ESG index information, and the information carried by the ESG Initialization Container 1340 is as follows. A container header 1332 is included. An ESG Initialization message 1333 includes an option of a decoder for deciphering of the ESG, and Partition information 1334 includes session separation criterion information and channel information of each session when the ESG is transmitted through a plurality of sessions. An Index List 1335 and an Index Structure 1336 include fragments of the transmission ESG, and mapping information between containers 1340-1 to 1340-n. Further a File Description Table (Full FDT) Instance 1321 is additionally included.

The ESG is contained in several containers during its transmission as shown in FIG. 13, and each container is composed of Fragment Management information indicating information on the fragments constituting the corresponding container, and ESG fragments, Before a description of an operation of receiving a notification message according to the second exemplary embodiment of the present invention is given, types of the notification messages will first be described. The notification message can be roughly divided into two types.

A first notification message is a general notification message that is delivered to every user for general purpose. This notification message is used by the service provider to provide disaster broadcast or system change information to the users.

A second notification message is a specific notification message that is limited to a specific service. This notification message is transmitted only to the users receiving the specific service, and can be used to indicate a change and start of the service. The specific notification message can also be generated and transmitted separately for each individual specific user group rather than each individual service. The "specific user group" can be a user group formed through notification service subscription, or a user group formed when a network intends to deliver a notification message to a specific area. When there is an intention to deliver a notification message to the user group formed through service subscription, it is possible to transmit the notification message on a point-to-point basis because information on each subscriber is managed. When there is an intention to deliver the notification message separately to each individual specific area, the user group located in the specific area is not separately managed.

Figure 14:
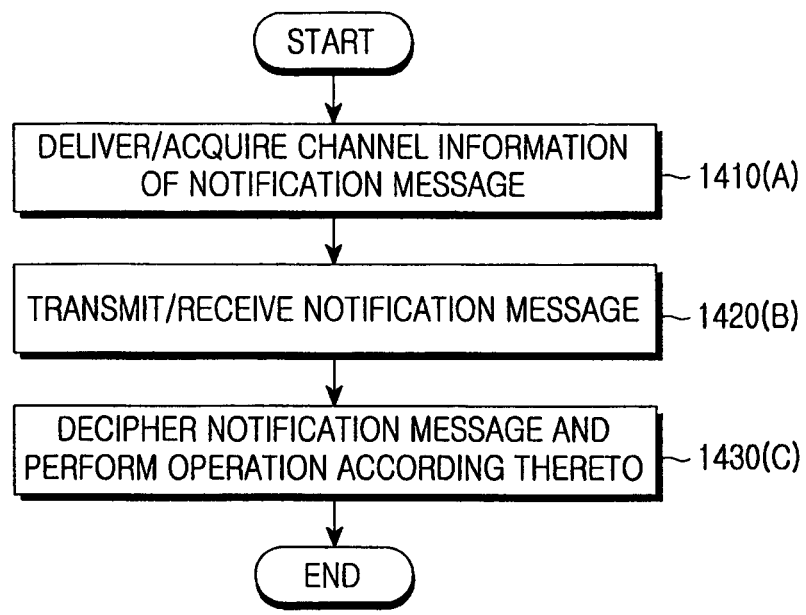
FIG. 14 is a flowchart illustrating a schematic transmission/reception process for a notification message according to the second exemplary embodiment of the present invention.

In transmission/reception of the notification message, the overall flow according to the second exemplary embodiment of the present invention is shown in FIG. 14. As shown in FIG. 14, the present invention roughly includes an operation A (1410) of delivering/acquiring notification message channel information, an operation B (1420) of transmitting/receiving a notification message, and an operation C (1430) in which a terminal receives and deciphers a notification message and performs an operation according thereto. The operation A (1410) will be described in the second exemplary embodiment, the operation B (1420) will be described with reference to FIGS. 21 to 26, and a description of the operation C (1430) will be omitted for clarity and conciseness.

I. Operation A (1410)

In a DVB-CBMS system according to the second exemplary embodiment, notification message channel information is transmitted to a terminal using an ESG, and the terminal recognizes that a received packet includes a notification message, using the channel information.

With reference to Table 12 below, a description will now be made of notification message channel information applied to the DVB-CBMS system according to an exemplary embodiment of the present invention.

TABLE 12

| Name | Type | Category | Description |
|---|---|---|---|
| NotificationEntry | E | M | An entry for Notification message |
| NotificationPort | A | M | Port of Notification Message delivery |
| NotificationAddress | A | O | IP address of Notification Message delivery |

A description of the terms used in Table 12 will be described. 'Name' indicates names of element values and attribute values constituting the corresponding message. 'Type' indicates whether the corresponding name corresponds to an element value or an attribute value. The element value has values of E1, E2, E3 and E4. E1 means an upper element value for the whole message, E2 indicates a sub-element value of E1, E3 indicates a sub-element value of E2, and E4 indicates a sub-element value of E3. The attribute value is indicated by A, and A indicates an attribute value of the corresponding element. For example, A under E1 indicates an attribute value of E1.

'Category' is used for indicating whether a corresponding element value or attribute value is mandatory, and has a value M if the value is mandatory, and a value O if the value is optional. 'Description' defines the meaning of the corresponding element or attribute value.

An element NotificationEntry has two attributes of NotificationPort and NotificationAddress. The NotificationPort and NotificationAddress indicate information on the channel through which the terminal can receive the notification message. Use of the IP as a data transmission technology is discussed below. If a method, in which the terminal can receive the notification message on the assumption that the IP is used, provides information on the IP address to which the notification message is to be delivered, and provides information on a UDP port number on the assumption that UDP is used over the IP layer, then the terminal can receive the notification message. The reason for using the UDP is as follows. Although other transport protocols such as TCP can also be used, a header of the UDP transport protocol has less overhead and does not support reception acknowledgement. Thus the UDP transport protocol is appropriate for the characteristics of the unidirectionally transmitted broadcast service.

When the notification message is delivered on a point-to-point basis, TCP can be used instead of UDP. Therefore, it should be understood that a TCP port is used as a notification message port in the point-to-point scheme unless stated otherwise. Although a UDP port will be used as the notification message port in the following description, the TCP port can be used as the notification message port in the point-to-point scheme as stated above.

NotificationPort has a UDP port number previously allocated such that the network provider or service provider uses the UDP port number when it sends the notification message. The terminal, receiving a message transmitted via a UDP port designated for use of the notification message, can immediately recognize the corresponding packet as a notification message and process the packet, because it is aware of the UDP port for the notification message.

An operation of generating a notification message as a transmission message can be achieved in the Notification Event Function 1102a or the Notification Distribution/Adaptation Function 1103b of FIG. 11. An entity for generating the notification message has information on all the ongoing sessions. That is, it is possible to attach the notification message to the existing transport session without generating a separate new session. A basic identification unit of the session is composed of an IP address, and the notification message uses an IP address of the ongoing session. Herein, the ongoing session can be associated with a specific service connected to a notification-requiring Acquisition fragment.

Because the mobile broadcast system delivers the notification message through the ongoing IP session by simply differentiating the UDP port number, the terminal can immediately receive the notification message (general notification message or specific notification message related to a service of the ongoing session) without the need to separately monitor the session. The NotificationPort can be used when the terminal is receiving the mobile broadcast service and desires to deliver the notification message through an IP flow (or IP transport path) where the mobile broadcast service is being transmitted.

The NotificationAddress is used when there is an intention to allocate a dedicated IP address during delivery of the notification message and to deliver the notification message through a flow (or transport path) having the IP address. The NotificationAddress provides an IP address in order to deliver the general or specific notification message to the terminal receiving the mobile broadcast service or the terminals in the idle mode, not receiving the mobile broadcast service to save power. With the use of the NotificationPort and the NotificationAddress, the terminal receives the notification message according to a reception address for the notification message of the entity desiring to deliver the terminal's situation or the notification message.

In the broadcasting system according to an exemplary embodiment of the present invention, because the terminal that has already accessed the broadcast service receives a PSI/SI signal, the transmitter does not separately transmit the notification message channel information.

A description will now be made of a method for delivering the notification message in the broadcasting system according to an exemplary embodiment of the present invention.

For the general notification message, the transmitter inserts the channel information of Table 12 into the ESG Bootstrap Descriptor 1313 of FIG. 13 before transmission. For the specific notification message, the transmitter inserts the channel information of Table 12 into the Acquisition fragment 1208 of FIG. 12.

Figure 15:
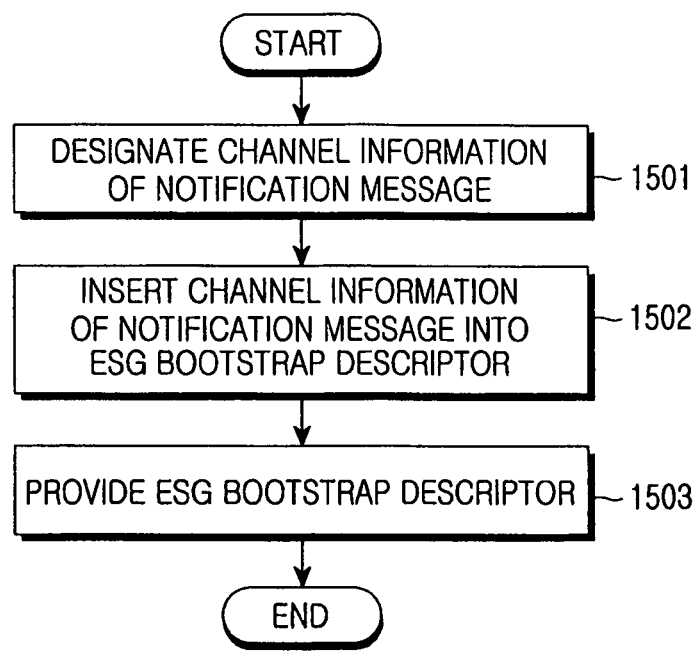
FIG. 15 is a flowchart illustrating an operation of generating and delivering an ESG Bootstrap Descriptor in a broadcasting system according to the second exemplary embodiment of the present invention.
Figure 16:
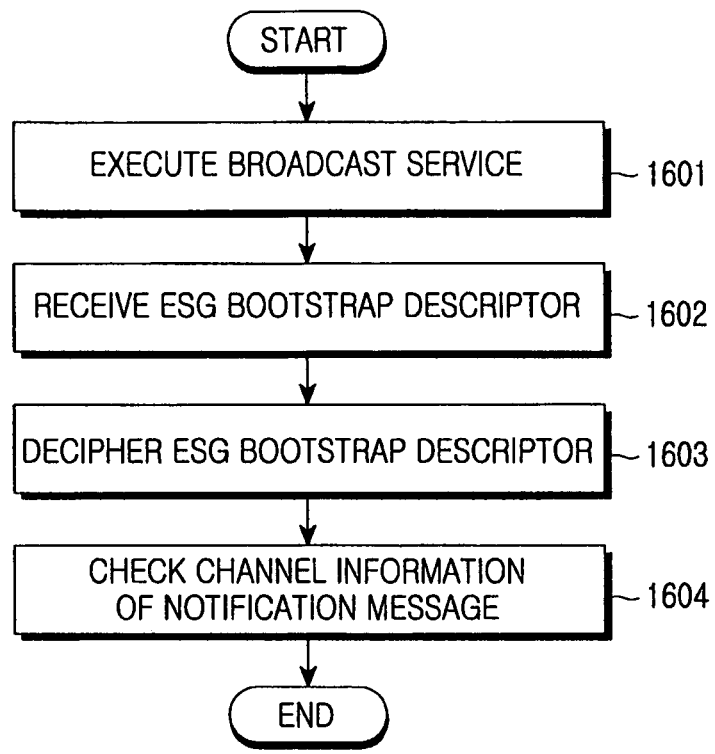
FIG. 16 is a flowchart illustrating an operation of receiving notification message channel information in an ESG Bootstrap Descriptor by a Terminal in a broadcasting system according to the second exemplary embodiment of the present invention.

With reference to FIGS. 15 and 16, a description will now be made of the transmission/reception of the ESG Bootstrap Descriptor 1313 in the broadcasting system according to the second exemplary embodiment of the present invention.

FIG. 15 is a flowchart illustrating an operation of generating and delivering an ESG Bootstrap Descriptor 1313 in a broadcasting system according to the second exemplary embodiment of the present invention.

Referring to FIG. 15, a Notification Distribution/Adaptation Function 1103b designates elements and attributes of general notification message channel information as ESG bootstrap information to be delivered to a Terminal 1108 in step 1501. Particularly, in step 1501, the NotificationEntry, NotificationPort, and NotificationAddress values described above are designated. Herein, the elements and attributes of the general notification message channel information are previously determined according to the broadcast provider or system environment. After step 1501, the Notification Distribution/Adaptation Function 1103b generates an ESG Bootstrap Descriptor 1313 including the general notification message channel information in step 1502. Thereafter, in step 1503, the Notification Distribution/Adaptation Function 1103b delivers the generated ESG Bootstrap Descriptor 1313 to the Terminal 108. Although the generation of the general notification message channel information is achieved herein by the Notification Distribution/Adaptation Function 1103b, it can also be accomplished by a Notification Event Function 1102a.

FIG. 16 is a flowchart illustrating an operation of receiving notification message channel information in an ESG Bootstrap Descriptor 1313 by a Terminal 1108 in a broadcasting system according to the second exemplary embodiment of the present invention.

Referring to FIG. 16, a Terminal 1108 executes a broadcast service by a user in step 1601, and then receives an ESG Bootstrap Descriptor 1313 transmitted from a Notification Distribution/Adaptation Function 1103b in step 1602. Upon receipt of the ESG Bootstrap Descriptor 1313, the Terminal 1108 deciphers the ESG Bootstrap Descriptor 1313 in step 1603, and acquires NotificationEntry, NotificationPort, and NotificationAddress necessary for reception of a general notification message in step 1604. Thereafter, the Terminal 1108 proceeds to the operation B (1420) of FIG. 14.

Figure 17:
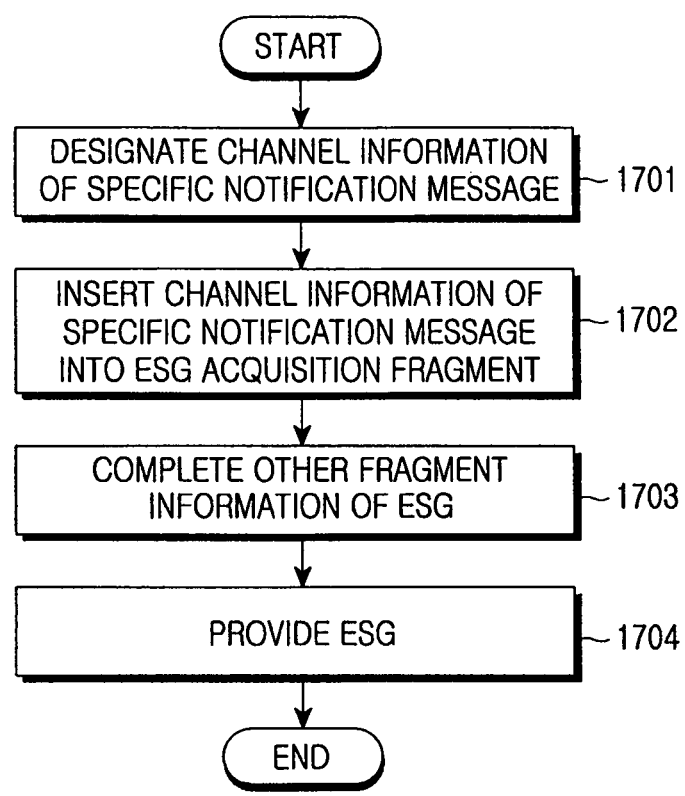
FIG. 17 is a flowchart illustrating an operation of generating and delivering notification message channel information in an ESG Acquisition fragment in a broadcasting system according to the second exemplary embodiment of the present invention.
Figure 18:
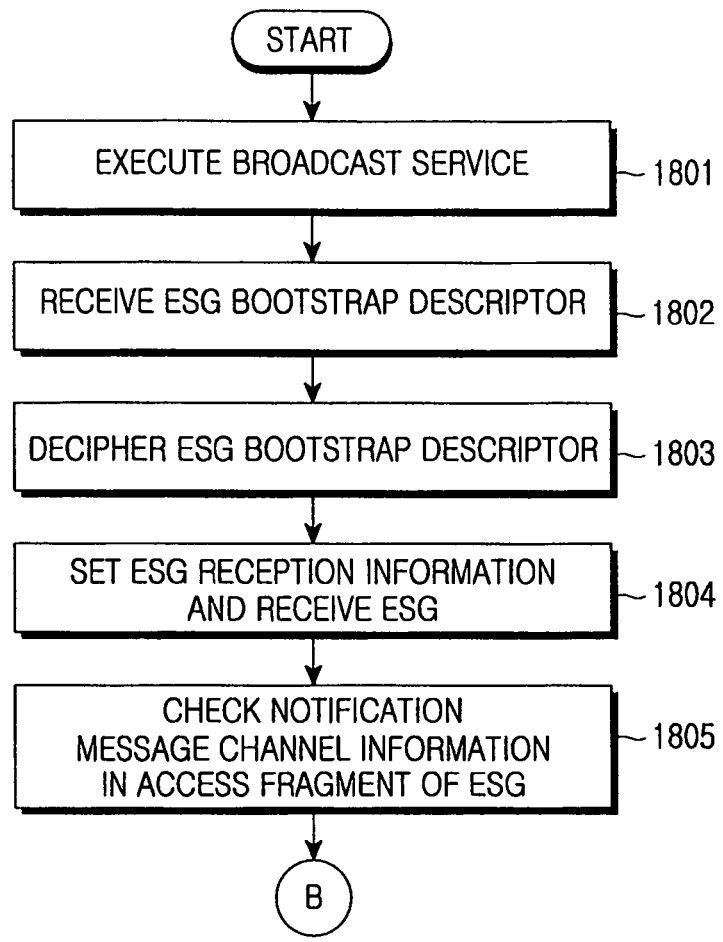
FIG. 18 is a flowchart illustrating an operation of receiving notification message channel information in an ESG Acquisition fragment by a Terminal in a broadcasting system according to the second exemplary embodiment of the present invention.

With reference to FIGS. 17 and 18, a description will now be made of transmission/reception of the ESG Acquisition fragment 1208 in the broadcasting system according to the second exemplary embodiment of the present invention.

FIG. 17 is a flowchart illustrating an operation of generating and delivering notification message channel information in an ESG Acquisition fragment 1208 in a broadcasting system according to the second exemplary embodiment of the present invention.

Referring to FIG. 17, a Notification Distribution/Adaptation Function 1103b designates elements and attributes of specific notification message channel information as ESG Acquisition fragment information to be delivered to a Terminal 1108 in step 1701. Particularly, in step 1701, the NotificationEntry, NotificationPort, and NotificationAddress described above are designated. Herein, the elements and attributes of the specific notification message channel information are previously determined according to broadcast provider or system environment. After step 1701, the Notification Distribution/Adaptation Function 1103b inserts the specific notification message channel information into an ESG Acquisition fragment 1208 in step 1702. Thereafter, the Notification Distribution/Adaptation Function 1103b completes the ESG by combining the ESG Acquisition fragment 1208 with other fragments in step 1703, and then delivers the ESG to the Terminal 1108 in step 1704. Although the generation of the specific notification message channel information is achieved herein by the Notification Distribution/Adaptation Function 1103b, it can also be accomplished by a Notification Event Function 1102a.

FIG. 18 is a flowchart illustrating an operation of receiving notification message channel information in an ESG Acquisition fragment 1208 by a Terminal 1108 in a broadcasting system according to the second exemplary embodiment of the present invention.

Referring to FIG. 18, a Terminal 1108 executes a broadcast service by a user in step 1801, and then receives an ESG Bootstrap Descriptor 1313 transmitted from a Notification Distribution/Adaptation Function 1103b in step 1802. Upon receipt of the ESG Bootstrap Descriptor 1313, the Terminal 1108 deciphers the ESG Bootstrap Descriptor 1313 in step 1803. Thereafter, in step 1804, the Terminal 1108 acquires the information available for reception of the ESG, performs hardware and software setting for reception of the ESG using the acquired information, and then immediately receives the ESG. In step 1805, the Terminal 1108 acquires and checks the NotificationEntry, NotificationPort, and NotificationAddress which is necessary for the reception of a specific notification message, and is included in an Acquisition fragment 1208 of the ESG Thereafter, the Terminal 1108 proceeds to the operation B (1420) of FIG. 14.

As another example, the Terminal 1108 can recognize a specific service connected to the notification message by receiving the notification message and deciphering a Service_ID inserted in the notification message, without obtaining specific notification message channel information through the Acquisition fragment 1208 of the ESG as done in FIGS. 17 and 18. It is preferable that the Service_ID has the same meaning as the service ID in the ESG.

II. Operation B (1420)

Figure 19:
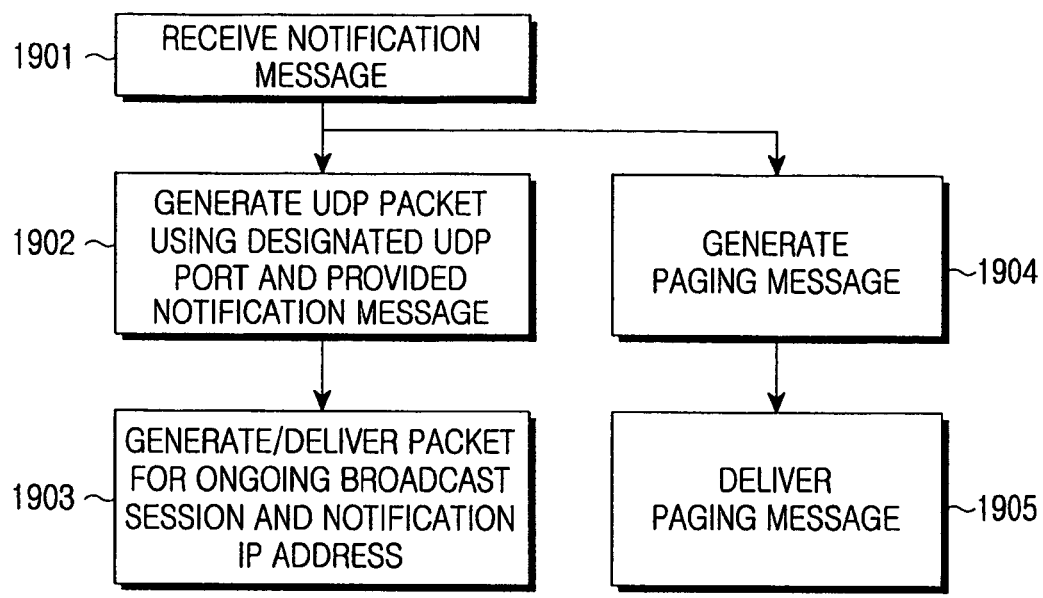
FIG. 19 is a flowchart illustrating an operation of delivering a general notification message in a broadcasting system according to the second exemplary embodiment of the present invention.

With reference to FIG. 19, a description will now be made of transmission of a notification message according to the second exemplary embodiment of the present invention. Because the general notification message and the specific notification message are equal to each other in terms of the transmission method, they will not be distinguished in the description of FIG. 19.

FIG. 19 is a flowchart illustrating an operation of delivering a general notification message in a broadcasting system according to the second exemplary embodiment of the present invention.

Referring to FIG. 19, a Notification Distribution/Adaptation Function 1103b receives a general notification message containing notification content (i.e. notification event) from a Notification Event Function 1102a in step 1901. In step 1902, the Notification Distribution/Adaptation Function 1103b then generates a UDP packet using a predetermined UDP port and the general notification message. A format of the general notification message, as it is defined in the service provider level, is not directly related to transmission, so the general notification message is immediately generated into a UDP packet. Thereafter, in step 1903, the Notification Distribution/Adaptation Function 1103b generates a packet according to the ongoing broadcast session and the previously designated notification IP address using the generated notification message, and delivers the generated packet to the terminals. Meanwhile, in the service area, the possibly exists that there are terminals in the sleep state where they are connected to an Interaction Network 1107 or can receive a paging message but their broadcast receiver is disabled. For the terminals in this state, the system should wake up the sleeping broadcast receivers (not shown) of the terminals by using the interaction channel of the Interaction Network 1107 or performing a paging through another means. To this end, the system generates a paging message for waking up the sleeping broadcast receiver in step 1904, and sends the paging message to the terminals through the interaction channel of the Interaction Network 1107 or another means in step 1905, thereby waking up the sleeping broadcast receivers of the terminals.

A packet for carrying the general notification message is generated using a previously designated UDP port number, i.e. NotificationPort, for use of notification delivery. This is to allow the Terminal 1108 to recognize the received packet as a general notification message. The generated UDP packets are generated into IP packets using an IP address of the current ongoing session or an IP address for delivery of the general notification message, i.e. NotificationAddress. An IP address of the current ongoing session can be acquired because the Notification Distribution/Adaptation Function 1103b for generating a notification delivery message exists in the Service Management 1103 for managing all transmissions. The completed IP packets are delivered to a transmitter of a lower layer. In this case, the general notification message can be repeatedly delivered to the transmitter of the lower layer several times according to the needs of the network provider or service provider, taking into account the situation in which there is a packet loss or a packet reception may fail.

Figure 20:
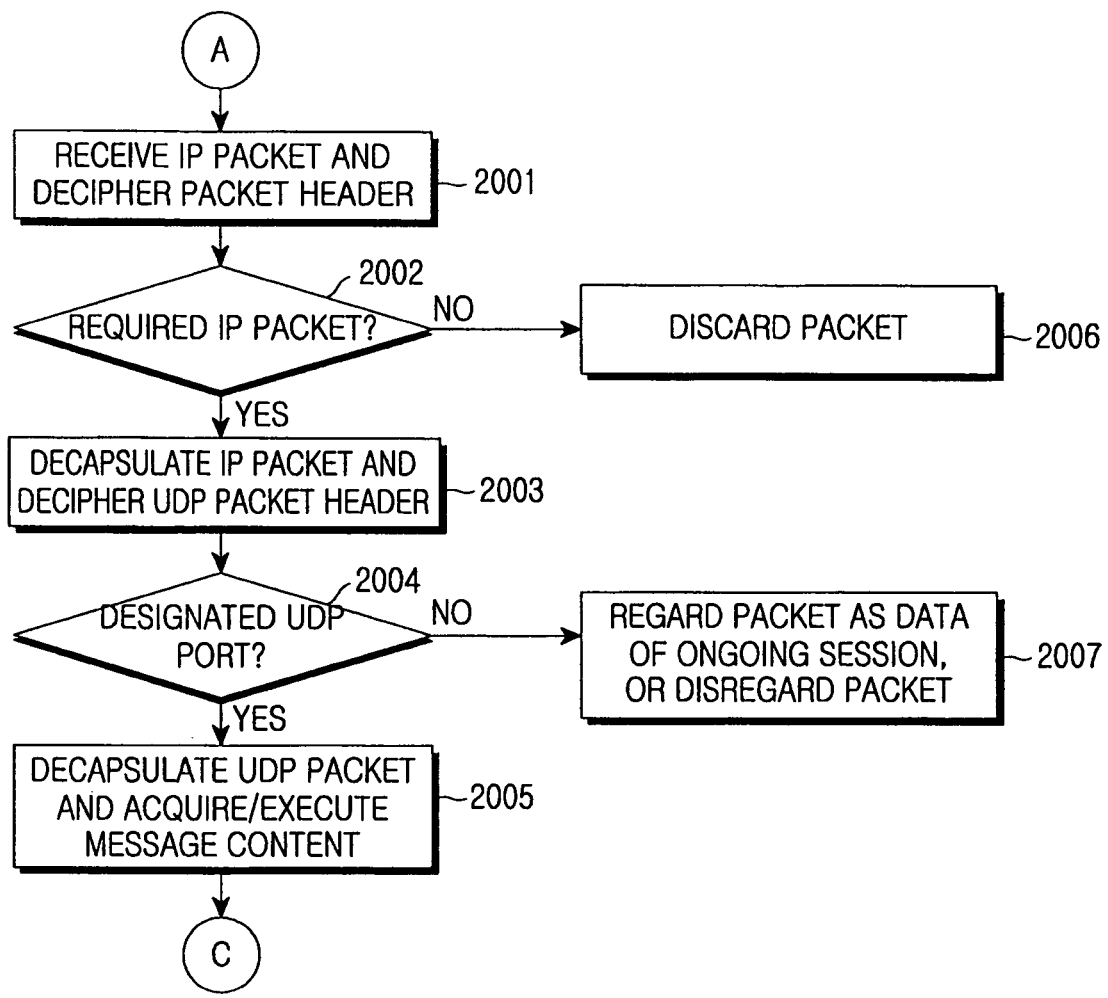
FIG. 20 is a flowchart illustrating an operation of receiving a notification message by a Notification Client Function of a terminal in a mobile broadcast system according to the second exemplary embodiment of the present invention.
Figure 21:
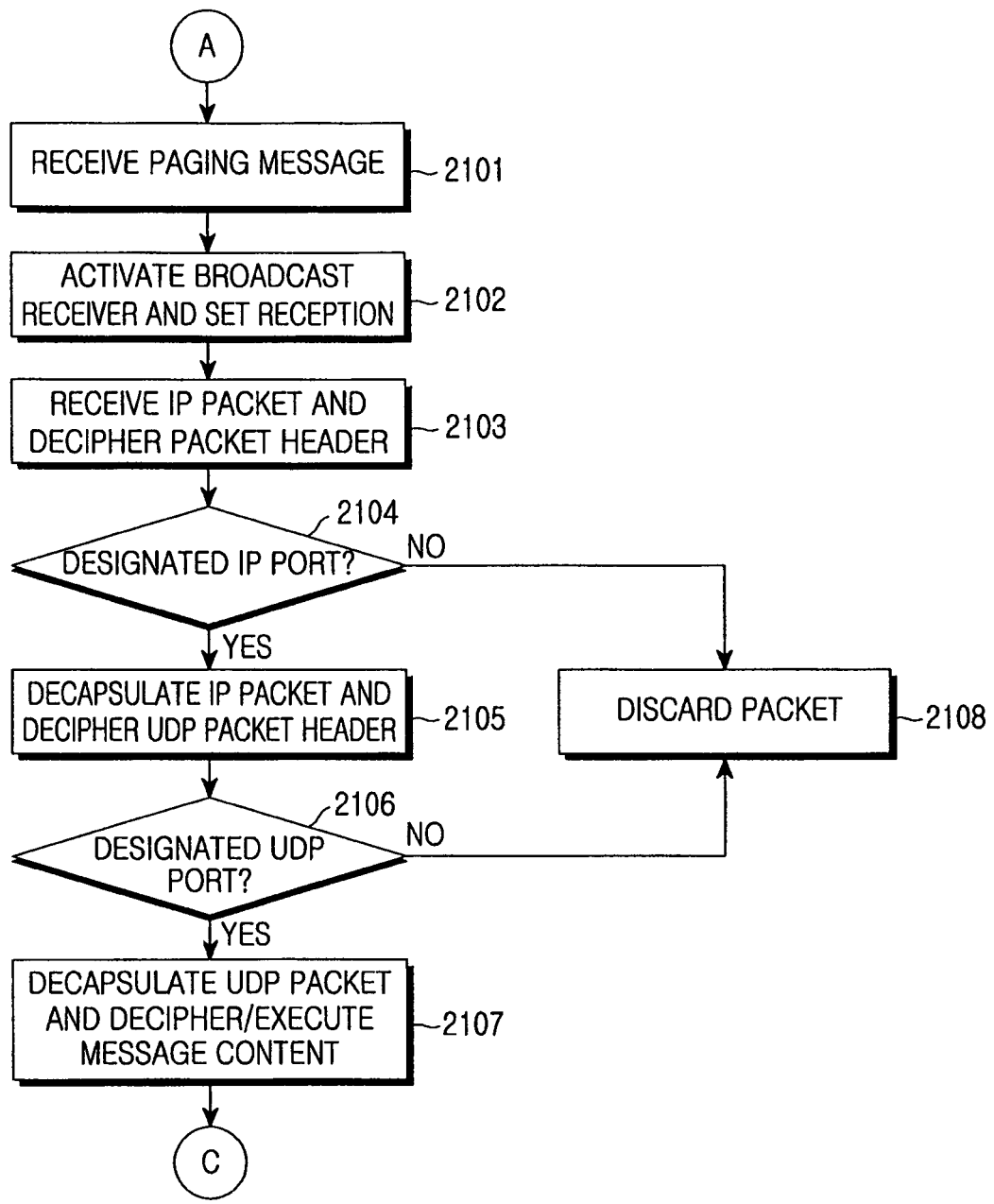
FIG. 21 is a flowchart illustrating a process of receiving a notification message in a Notification Client Function of a terminal when it is connected to an Interaction Network in a broadcasting system according to the second exemplary embodiment of the present invention.

With reference to FIGS. 20 and 21, a description will now be made of an operation of receiving a notification message in a broadcasting system according to the second exemplary embodiment of the present invention. Because the general notification message and the specific notification message are equal to each other in terms of the reception method, they will not be distinguished in the following description.

FIG. 20 is a flowchart illustrating an operation of receiving a notification message by a Notification Client Function

1108a of a terminal in a mobile broadcast system according to the second exemplary embodiment of the present invention.

Referring to FIG. 20, after receiving the notification message channel information in operation A (1410) of FIG. 14, a Notification Client Function 1108a receives an IP packet and deciphers a header of the IP packet in step 2001. The Notification Client Function 1108a determines in step 2002 whether an address of the IP packet is identical to its required IP address as a result of the header deciphering. Herein, the "required IP address" means an IP address of the current ongoing session or a specific IP address, i.e. NotificationAddress, allocated for the notification message. Therefore, if the IP address in the header is not the required IP address as a result of the IP check, the Notification Client Function 1108a discards the received IP packet in step 2006.

However, if the address of the received IP packet is identical to the required IP address, the Notification Client Function 1108a proceeds to step 2003 where it acquires a UDP packet through decapsulation on the IP packet and deciphers a header of the UDP packet. Thereafter, the Notification Client Function 1108a determines in step 2004 whether a UDP port number obtained by deciphering the header of the UDP packet is identical to a port number NotificationPort of predetermined notification message channel information, previously obtained through an ESG Bootstrap Descriptor 1313 or a PSI/SI signal. That is, the Notification Client Function 1108a determines whether the received packet is a general notification message or a packet of a general broadcast session.

If it is determined in step 2004 that the port number of the received UDP packet header is identical to the UDP port number designated to receive the notification message, the Notification Client Function 1108a decapsulates the received UDP packet to obtain a general notification message included in its payload, and deciphers the notification message to perform a necessary operation in step 2005, and then proceeds to the operation C (1430) of FIG. 14. However, if the port number of the received UDP packet is different from the pre-designated UDP port number, the Notification Client Function 1108a proceeds to step 2007 where it handles the received UDP packet for the broadcast service, regarding it as a packet of the existing broadcast session, or disregards the received UDP packet if it is not its desired notification message.

FIG. 21 is a flowchart illustrating a process of receiving a notification message in a Notification Client Function 1108a of a terminal when it is connected to an Interaction Network in a broadcasting system according to the second exemplary embodiment of the present invention. This process can be applied not only to the Interaction Network but also to a terminal connected to a system capable of managing a sleeping terminal.

Referring to FIG. 21, after receiving the notification message channel information in operation A (1410) of FIG. 14, a Notification Client Function 1108a receives a paging message according to a paging mechanism of the Interaction Network or another system in step 2101. In step 2102, the Notification Client Function 1108a activates a sleeping broadcast receiver through the paging message and prepares for reception. The reception preparation includes generating a session using NotificationPort and NotificationAddress transmitted in the method described through the second exemplary embodiment, and entering a ready state. After entering the ready state, the Notification Client Function 1108a deciphers a header of a received IP packet upon receipt of the IP packet from a Notification Distribution/Adaptation Function 1103b in step 2103.

The Notification Client Function 1108a determines in step 2104 whether an address of the IP packet is identical to an IP address designated from the NotificationAddress. If it is determined that the address in a header of the IP packet is different from the address of the NotificationAddress, the Notification Client Function 1108a discards the packet in step 2108. However, if the IP address of the received IP packet is identical to the IP address of the NotificationAddress, the Notification Client Function 1108a deciphers a header of a UDP packet extracted by decapsulating the IP packet in step 2105.

The Notification Client Function 1108a determines in step 2106 whether a UDP port number obtained by deciphering the header of the UDP packet is identical to a UDP port number of the NotificationPort. Step 2106 is performed to determine whether the received packet is a general notification message or a wrongly transmitted packet.

If it is determined in step 2106 that the port number of the received UDP packet header is identical to the NotificationPort, i.e. the UDP port number designated to receive the general notification message, the Notification Client Function 1108a decapsulates the UDP packet to obtain a notification message included in this payload and deciphers the notification message to perform a necessary operation in step 2107, and then proceeds to the operation C (1430) of FIG. 14. However, if the port number of the received UDP packet is different from the port number of the NotificationPort, the Notification Client Function 1108a discards the received UDP packet in step 2108, regarding it as a wrongly transmitted UDP packet. Thereafter, the terminal proceeds to the operation C (1430) of FIG. 14. The operation C is not related to the gist of an exemplary embodiment of the present invention, so a description thereof will be omitted.

As can be understood from the foregoing description, an exemplary embodiment of the present invention sets an IP address and a UDP port for notification message delivery in an SGDD to prevent the need for deciphering all headers for a received signal, thereby reducing system overhead and making it possible to deliver the notification message even when the terminal is in a sleep state or is interacting with another system.

Exemplary embodiments of the present invention may be embodied in a general-purpose computer by running a program from a computer-readable medium, including but not limited to storage media such as magnetic storage media (ROMs, RAMs, floppy disks, magnetic tapes, and the like), optically readable media (CD-ROMs, DVDs, and the like).

While certain exemplary embodiments of the invention has have been shown and described hereinwith reference to a certain preferred embodiments thereof, it will be understood by those skilled in the art that various changes in form and details may be made therein without departing from the spirit and scope of the invention as defined by the appended claims and their equivalents.

What is claimed is:

1. A method for transmitting a broadcast service in an Internet protocol (IP)-based broadcasting system, the method comprising the steps of:
    (a) transmitting, by a transmitter, to a receiver a service guide including first access information and second access information via one of an broadcast network and an interaction network, the first access information including a first network address for transmitting a general notification message to the receiver and a first User Datagram Protocol (UDP) port used for transmitting the general notification message, the first network address being included in a service guide delivery descriptor (SGDD), and the second access information including a second network address for transmitting a specific notification message associated with a specific service and a second UDP port used for transmitting the specific notification message, the second network address being included in an access fragment, wherein a general notification message is delivered to every user for general purpose and a specific notification message is transmitted only the users receiving the corresponding service to indicate a change and a start of the service;

(b) generating the general notification message and transmitting the generated general notification message to the receiver via one of the broadcast network and the interaction network using the first network information if a general notification event occurs; and (c) generating the specific notification message and transmitting the generated specific notification message to the receiver via one of the broadcast network and the interaction network using the second access information, if a specific notification event occurs, wherein the SGDD provides a pointer to a transport session; and wherein the access fragment provides information on what capabilities are required from the receiver.

2. The method of claim 1, further comprising the step of transmitting a paging message before transmitting the first access information.

3. The method of claim 1, wherein the first network address includes an IP address of a current on-going session.

4. The method of claim 1, wherein the second network address includes an IP address of a current on-going session.

5. An Internet protocol (IP)-based broadcasting system, comprising:

a notification distribution processor for transmitting a service guide including first access information and second access information via one of a broadcast network and an interaction network, the first access information including a first network address for transmitting a general notification message to the receiver and a first User Datagram Protocol (UDP) port used for transmitting the general notification message, the first network address being included in a service guide delivery descriptor (SGDD), and the second access information including a second network address for transmitting a specific notification message associated with a specific service and a second UDP port used for transmitting the specific notification message, the second network address being included in an access fragment, wherein a general notification message is delivered to every user for general purpose and a specific notification message is transmitted only the users receiving the corresponding service to indicate a change and a start of the service;

a notification generation processor for generating, if a general notification event occurs, the general notification message;

the notification distribution processor being adapted for transmitting the generated general notification message via one of the broadcast network and the interaction network using the first network information; and if a specific notification event occurs, the notification generation processor being adapted to generate the specific notification message and the notification distribution processor being adapted to transmit the generated specific notification message via one of the broadcast network and the interaction network using the second network information, wherein the SGDD provides a pointer to a transport session; and wherein the access fragment provides information on what capabilities are required from the receiver.

6. The system of claim 5, wherein the notification distribution processor further transmits a paging message before transmitting the first access information.

7. The system of claim 5, wherein the first network address includes an IP address of a current on-going session.

8. The system of claim 5, wherein the second network address includes an IP address of a current on-going session.

9. A method for receiving a broadcast service in an Internet protocol (IP)-based broadcasting system, the method comprising the steps of:

(a) receiving, by a receiver, a service guide including first access information and second access information via one of a broadcast network and an interaction network, the first access information including a first network address for transmitting a general notification message to the receiver and a first User Datagram Protocol (UDP) port used for receiving the general notification message, the first network address being included in a service guide delivery descriptor (SGDD), and the second access information including a second network address for transmitting a specific notification message associated with a specific service and a second UDP port used for receiving the specific notification message, the second network address being included in an access fragment, wherein a general notification message is delivered to every user for general purpose and a specific notification message is transmitted only the users receiving the corresponding service to indicate a change and a start of the service;

(b) receiving, by the receiver, the general notification message based on the first network information if the receiver receives a general broadcast service; and (c) receiving, by the receiver, the specific notification message based on the second network information, if the receiver receives a specific broadcast service, wherein the SGDD provides a pointer to a transport session; and wherein the access fragment provides information on what capabilities are required from the receiver.

10. The method of claim 9, further comprising the step of receiving a paging message before receiving the first access information, if the broadcast receiver is in a sleep state.

11. The method of claim 9, wherein the first network address includes an IP address of a current on-going session.

12. The method of claim 9 wherein the second network address includes an IP address of a current on-going session.

13. A terminal of an Internet protocol (IP)-based broadcasting system, comprising:

a notification client for receiving a service guide including first access information and second access information via one of a broadcast network and an interaction network, the first access information including a first network address for transmitting a general notification message to the receiver and a first User Datagram Protocol (UDP) port used for receiving the general notification message; the first network address being included in a service guide delivery descriptor (SGDD), and the second access information including a second network address for transmitting a specific notification message associated with a specific service and a second UDP port used for receiving the specific notification message, the second network address being included in an access fragment, wherein a general notification message is delivered to every user for general purpose and a specific notification message is transmitted only the users receiving the corresponding service to indicate a change and a start of the service, wherein the SGDD provides a pointer to a transport session; and wherein the access fragment provides information on what capabilities are required from the receiver.

14. The terminal of claim 13, wherein the notification client further receives a specific notification message based on the second access information.

15. The terminal of claim 13, wherein the notification client further receives a paging message before receiving the first access information, if the broadcast receiver is in a sleep state.

16. The terminal of claim 13, wherein the first network address includes an IP address of a current on-going session.

17. The terminal of claim 13, wherein the second network address includes an IP address of a current on-going session.

18. A method for providing a broadcast service in a transmitter of an Internet protocol (IP)-based broadcasting system, the method comprising the steps of:
   (a) transmitting, by a transmitter, to a receiver a service guide including first access information and second access information via one of a broadcast network and an interaction network, the first access information including a first network address for pushing a general notification message to the receiver and a first User Datagram Protocol (UDP) port used for transmitting the general notification message, the first network address being included in a service guide delivery descriptor (SGDD), and the second access information including a second network address for pushing a specific notification message associated with a specific service and a second UDP port used for transmitting the specific notification message, the second network address being included in an access fragment, wherein a general notification message is delivered to every user for general purpose and a specific notification message is transmitted only the users receiving the corresponding service to indicate a change and a start of the service;
   (b) generating the general notification message and pushing the generated general notification message to the receiver via one of the broadcast network and the interaction network using the first network information, if a general notification event occurs; and
   (c) generating the specific notification message and pushing the generated specific notification message to the receiver via one of the broadcast network and the interaction network using the second access information, if a specific notification event occurs, wherein the SGDD provides a pointer to a transport session; and wherein the access fragment provides information on what capabilities are required from the receiver.

19. A method for receiving a broadcast service in a broadcast receiver of an Internet protocol (IP)-based broadcasting system, the method comprising the steps of:
   (a) receiving by a receiver a service guide including first access information and second access information from a transmitter via one of a broadcast network and an interaction network, the first access information including a first network address for pushing a general notification message to the receiver and a first User Datagram Protocol (UDP) port used for receiving the general notification message, the first network address being included in a service guide delivery descriptor (SGDD), and the second access information including a second network address for pushing a specific notification message associated with a specific service and a second UDP port used for receiving the specific notification message, the second network address being included in an access fragment, wherein a general notification message is delivered to every user for general purpose and a specific notification message is transmitted only the users receiving the corresponding service to indicate a change and a start of the service;
   (b) receiving the pushed general notification message based on the first access information; and
   (c) receiving the pushed specific notification message based on the second access information, wherein the SGDD provides a pointer to a transport session; and wherein the access fragment provides information on what capabilities are required from the receiver.

\* \* \* \* \*

UNITED STATES PATENT AND TRADEMARK OFFICE
CERTIFICATE OF CORRECTION

PATENT NO. : 8,547,977 B2  Page 1 of 1
APPLICATION NO. : 11/505495
DATED : October 1, 2013
INVENTOR(S) : Jae-Yeon Song et al.

It is certified that error appears in the above-identified patent and that said Letters Patent is hereby corrected as shown below:

In the Claims

Claim 1, col. 39, line 24, should be replaced with corrected text, and the line should read:

capabilities are required for the receiver.

Claim 5, col. 40, line 4, should be replaced with corrected text, and the line should read:

capabilities are required for the receiver.

Claim 9, col. 40, line 43, should be replaced with corrected text, and the line should read:

capabilities are required for the receiver.

Claim 13, col. 41, line 8, should be replaced with corrected text, and the line should read:

capabilities are required for the receiver.

Claim 16, col. 42, line 11, should be replaced with corrected text, and the line should read:

capabilities are required for the receiver.

Claim 19, col. 42, line 41, should be replaced with corrected text, and the line should read:

capabilities are required for the receiver.

Signed and Sealed this
Seventeenth Day of February, 2015

Michelle K. Lee
*Deputy Director of the United States Patent and Trademark Office*